US012616324B2

(12) United States Patent
    Bacon

(10) Patent No.: US 12,616,324 B2
(45) Date of Patent: May 5, 2026

(54) BEVERAGE CADDY

(71) Applicant: BAUER PRODUCTS, INC., Grand Rapids, MI (US)

(72) Inventor: Bruce C. Bacon, Rockford, MI (US)

(73) Assignee: BAUER PRODUCTS, INC., Grand Rapids, MI (US)

( * ) Notice: Subject to any disclaimer, the term of this patent is extended or adjusted under 35 U.S.C. 154(b) by 63 days.

(21) Appl. No.: 18/670,005

(22) Filed: May 21, 2024

(65) Prior Publication Data

US 2025/0248551 A1 Aug. 7, 2025

Related U.S. Application Data

(63) Continuation-in-part of application No. 18/434,018, filed on Feb. 6, 2024, now Pat. No. 12,478,202.

(60) Provisional application No. 63/444,142, filed on Feb. 8, 2023.

(51) Int. Cl.
*A47K 1/08* (2006.01)
*A47G 23/02* (2006.01)
*F16M 13/02* (2006.01)

(52) U.S. Cl.
CPC ....... *A47G 23/0225* (2013.01); *F16M 13/022* (2013.01)

(58) Field of Classification Search
CPC .......................... A47G 23/0225; F16M 13/022
See application file for complete search history.

(56) References Cited

U.S. PATENT DOCUMENTS

| | | | |
|---|---|---|---|
| 2,707,141 A | 4/1955 | Witter | |
| 4,984,722 A | 1/1991 | Moore | |
| 5,280,870 A | 1/1994 | Chick et al. | |
| 5,720,516 A * | 2/1998 | Young ..................... A47C 7/68 | |
| | | | 297/188.14 |
| 6,010,104 A | 1/2000 | Hanson et al. | |
| 6,059,138 A | 5/2000 | Labruyere | |
| 7,284,737 B2 | 10/2007 | Kane | |
| 7,815,048 B2 | 10/2010 | Bean | |
| 7,959,121 B1 * | 6/2011 | Barnes, Jr. ......... A47G 23/0225 | |
| | | | 248/311.2 |
| 10,155,482 B2 | 12/2018 | Corso | |
| 12,196,365 B1 * | 1/2025 | Anselmo .............. F16M 13/022 | |
| 2004/0182897 A1 | 9/2004 | Andrews et al. | |
| 2005/0051690 A1 | 3/2005 | Phillips et al. | |

(Continued)

*Primary Examiner* — Amy J. Sterling
(74) *Attorney, Agent, or Firm* — PRICE HENEVELD LLP

(57) ABSTRACT

A beverage caddy assembly includes a collapsible cup holder. A mounting arm has a pair of first mounting arm segments and a second mounting arm segment moveable relative to the first mounting arm segment. A proximal end of each of the pair of first mounting arm segments is rigidly coupled with the collapsable cup holder. A hinge is provided on a distal end of the first mounting arm segment, wherein the cup holder is adapted for rotation between a first extended position and a second folded position about the hinge, disposing the cup holder in juxtaposed relation with the second mounting arm segment. An engagement member disposed on a distal portion of the second mounting arm segment of the mounting arm is adapted to engage a gaming machine, wherein the engagement member includes a mounting leg fixedly coupled with and extending orthogonally from the second mounting arm segment.

29 Claims, 28 Drawing Sheets

(56) References Cited

U.S. PATENT DOCUMENTS

| | | | |
|---|---|---|---|
| 2009/0206098 A1* | 8/2009 | Garahan | B60N 3/103 |
| | | | 220/737 |
| 2015/0021284 A1 | 1/2015 | Ashley | |
| 2015/0272363 A1 | 10/2015 | Ayoub | |
| 2019/0357688 A1 | 11/2019 | Dobson | |
| 2023/0146064 A1* | 5/2023 | Cheng | A47G 19/2288 |
| | | | 220/495.03 |

* cited by examiner allincupholder.com

BEVERAGE CADDY

CLAIM TO PRIORITY

This application is a continuation-in-part application of U.S. Pat. No. 12,478,202, issued Nov. 25, 2025, entitled "Beverage Caddy," and claims priority under 35 U.S.C. § 119 and/or 35 U.S.C. § 120 to commonly assigned and related U.S. Provisional Application No. 63/444,142, filed Feb. 8, 2023, entitled "Beverage Caddy," the entire disclosures of which are incorporated herein by reference.

FIELD OF THE INVENTION

The present invention relates to a beverage caddy assembly adapted to support a beverage and/or a cell phone for gaming tables, namely poker tables, and a beverage caddy assembly adapted to support a beverage for gaming machines, namely slot machines.

BACKGROUND OF THE INVENTION

An improved beverage caddy is adapted to support a beverage and a cell phone from a raised edge of a standard gaming table arm rest and a beverage caddy assembly adapted to support a beverage on gaming machines was desired.

SUMMARY OF THE INVENTION

One object of the present disclosure is a beverage caddy assembly that includes a collapsible cup holder and a mounting arm comprising a pair of first mounting arm segments and a second mounting arm segment moveable relative to the pair of first mounting arm segments, wherein a proximal end of each of the pair of first mounting arm segments is rigidly coupled with the collapsible cup holder. A pair of opposed hinge pins is disposed on each of the pair of first mounting arm segments, respectively, by which the pair of first mounting arm segments and the collapsible cup holder are operably coupled with the second mounting arm segment. A pair of elongated slots is disposed on the second mounting arm segment and within which the pair of opposed hinge pins are rotatably and slidingly received, wherein the collapsible cup holder is adapted for rotation between a first extended position and a second folded position disposing the collapsible cup holder in juxtaposed relation with the second mounting arm segment. An engagement member is disposed on the second mounting arm segment and is adapted for engaging a gaming machine. The pair of opposed hinge pins is disposed proximate a first end of the pair of elongated slots when in the first extended position and the pair of opposed hinge pins is disposed proximate a second end of the pair of elongated slots when in the second folded position.

Yet another aspect of the present disclosure is a beverage caddy that includes a cup holder and mounting arm comprising a pair of first mounting arm segments and a second mounting arm segment moveable relative to the pair of first mounting arm segments, wherein a proximal end of each of the pair of first mounting arm segments is rigidly coupled with the cup holder. A pair of opposed hinge pins is disposed on each of the pair of first mounting arm segments, respectively, by which the pair of first mounting arm segments and the cup holder are operably coupled with the second mounting arm segment. A pair of openings is disposed on the second mounting arm segment and within which the pair of opposed hinge pins are rotatably received, wherein the cup holder is adapted for rotation between a first extended position and a second folded position disposing the cup holder in juxtaposed relation with the second mounting arm segment. An engagement member is disposed on the second mounting arm segment and is adapted for engaging a gaming machine.

Another aspect of the present disclosure is a beverage caddy that includes a collapsible cup holder and a mounting arm comprising a pair of first mounting arm segments and a second mounting arm segment moveable relative to the pair of first mounting arm segments, wherein a proximal end of each of the pair of first mounting arm segments is rigidly coupled with the collapsible cup holder. A hinge is provided, by which a distal end of each of the pair of first mounting arm segments is operably coupled with the proximal end of the second first mounting arm segment, wherein the cup holder is adapted for rotation between a first extended position and a second folded position about the hinge disposing the cup holder in juxtaposed relation with the second mounting arm segment. An engagement member is disposed on a distal end of the second mounting arm segment of the mounting arm and is adapted to engage a gaming machine. The engagement member comprises a mounting leg fixedly coupled with and extending orthogonally from a distal portion of the second mounting arm segment.

Still another aspect of the present disclosure is a method of supporting a beverage from a gaming machine. The method comprising the steps of providing a beverage caddy assembly adapted to assume a collapsed configuration in which a collapsible cup holder is in the fully collapsed position, wherein the collapsible cup holder is operably coupled with a proximal end of a first mounting arm segment, and wherein the collapsible cup holder is adapted for rotation between a first extended position and a second folded position about a hinge disposing the cup holder in juxtaposed relation with the second mounting arm segment of a mounting arm comprising the first mounting arm segment and a second mounting arm segment, expanding the beverage caddy assembly to a deployed configuration in which the collapsible cup holder is in a first extended position and rotating the collapsible cup holder to the first extended position about the hinge, and disposing an engagement member on a distal end of the second mounting arm segment into engagement with the gaming machine.

These and other advantages of the invention will be further understood and appreciated by those skilled in the art by reference to the following written specification, claims, and appended drawings.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION OF THE PREFERRED EMBODIMENTS

For purposes of description herein, the terms "upper," "lower," "right," "left," "rear," "front," "vertical," "horizontal," and derivatives thereof shall relate to the invention as oriented in the attached drawings. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The beverage caddy assembly 10 disclosed herein may be utilized to support a beverage vessel 12 containing a beverage, such as cup, glass tumbler, can, bottle, etc., safely and reliably. While the term "cup" is used hereinafter, the term "cup" may be used interchangeably as any beverage vessel 12 that may include any of the aforementioned beverage vessels.

The improved beverage caddy assembly 10 may be adapted to support a beverage, a cell phone, and/or a player's purse or backpack from the raised outer edge OE of a standard gaming table rail R (which may also serve as an arm rest). The beverage caddy assembly 10 disclosed herein removes the beverage from the gaming table to prevent spills on the gaming table surface that may result in damage to the gaming table surface. In addition, with the beverage no longer on the gaming table, but at the height of the gaming table rail R, a player's hands may be in better view of a dealer.

Figure 1:
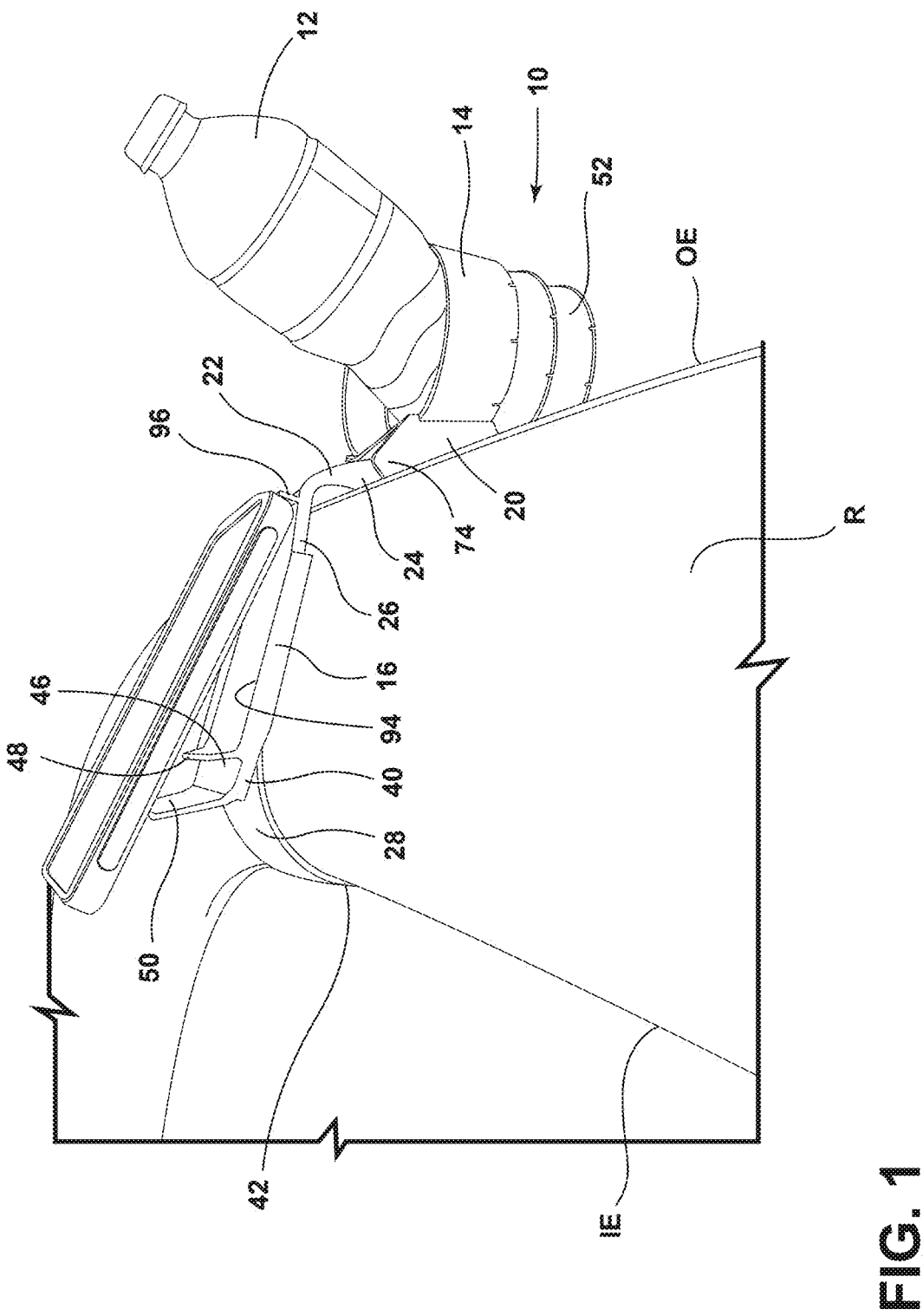
FIG. 1 is a perspective view of a first embodiment of the beverage caddy assembly according to the present disclosure supporting a beverage vessel and disposed over and about an inner edge of the perimeter rail of a gaming table.
Figure 2:
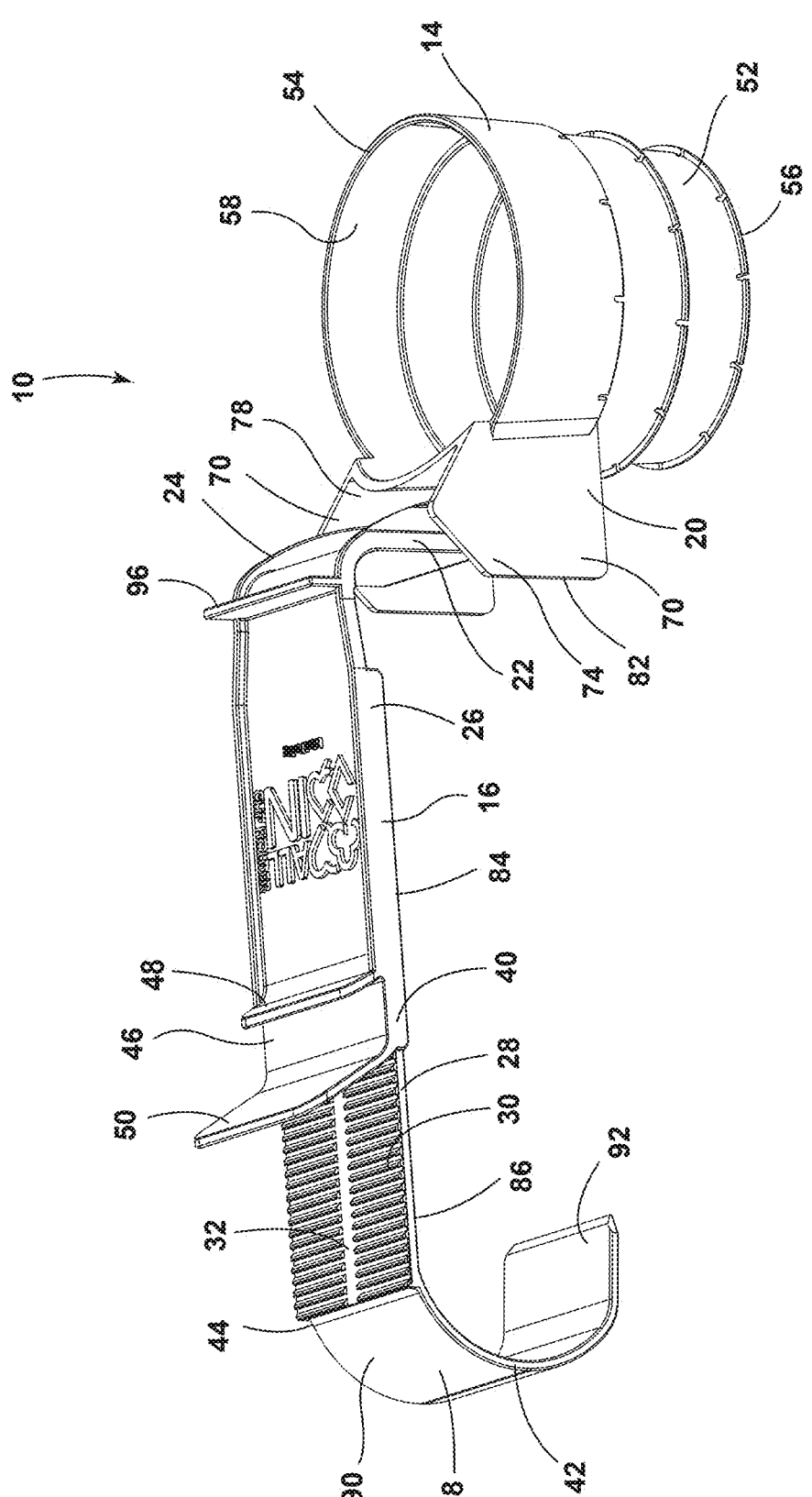
FIG. 2 is another perspective view of the beverage caddy assembly of FIG. 1 according to the first embodiment of the present disclosure.
Figure 10:
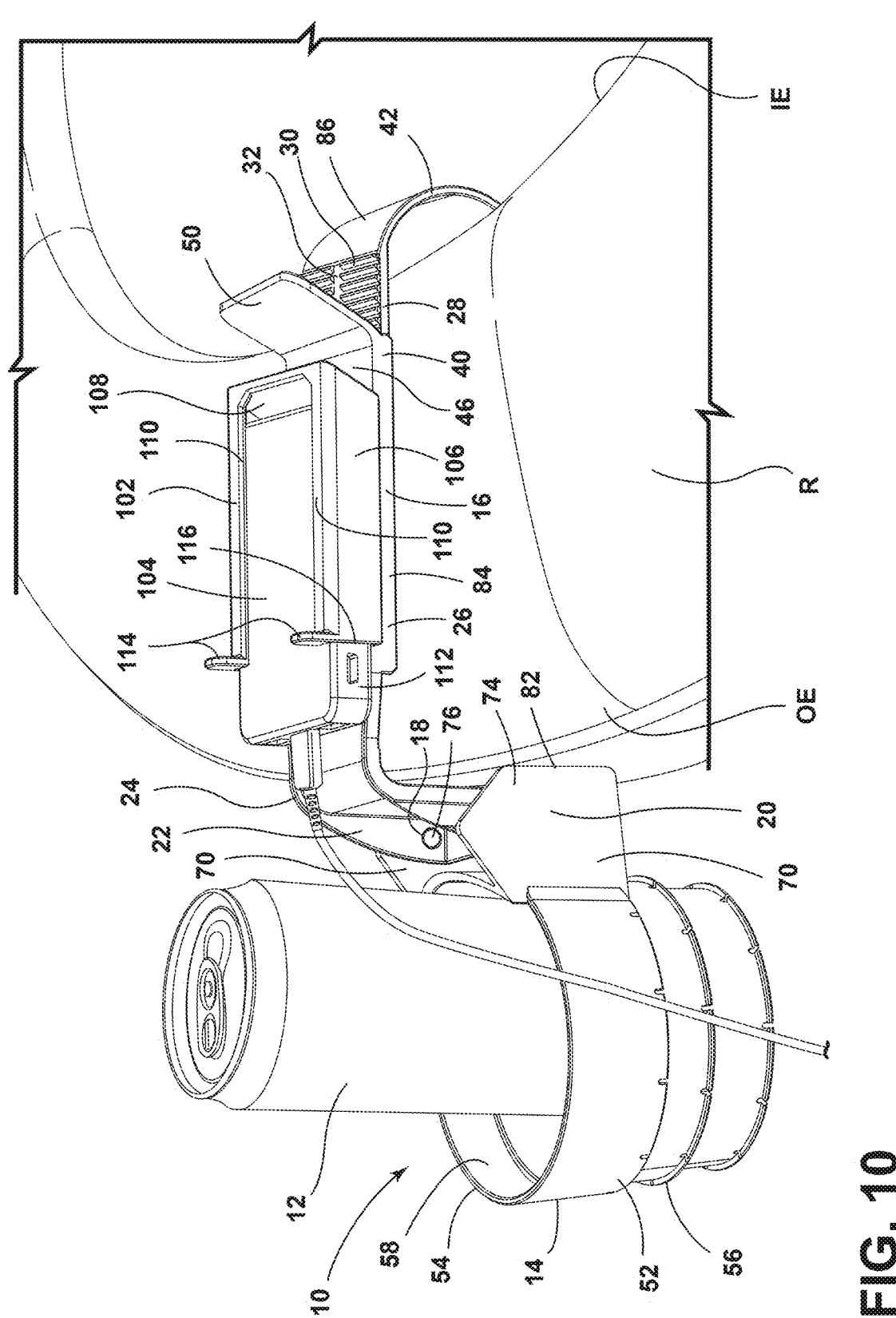
FIG. 10 is a perspective view of a second embodiment of the beverage caddy assembly according to the first embodiment of the present disclosure supporting a beverage vessel and a portable power module and disposed over and about an inner edge of the perimeter rail of a gaming table.
Figure 11:
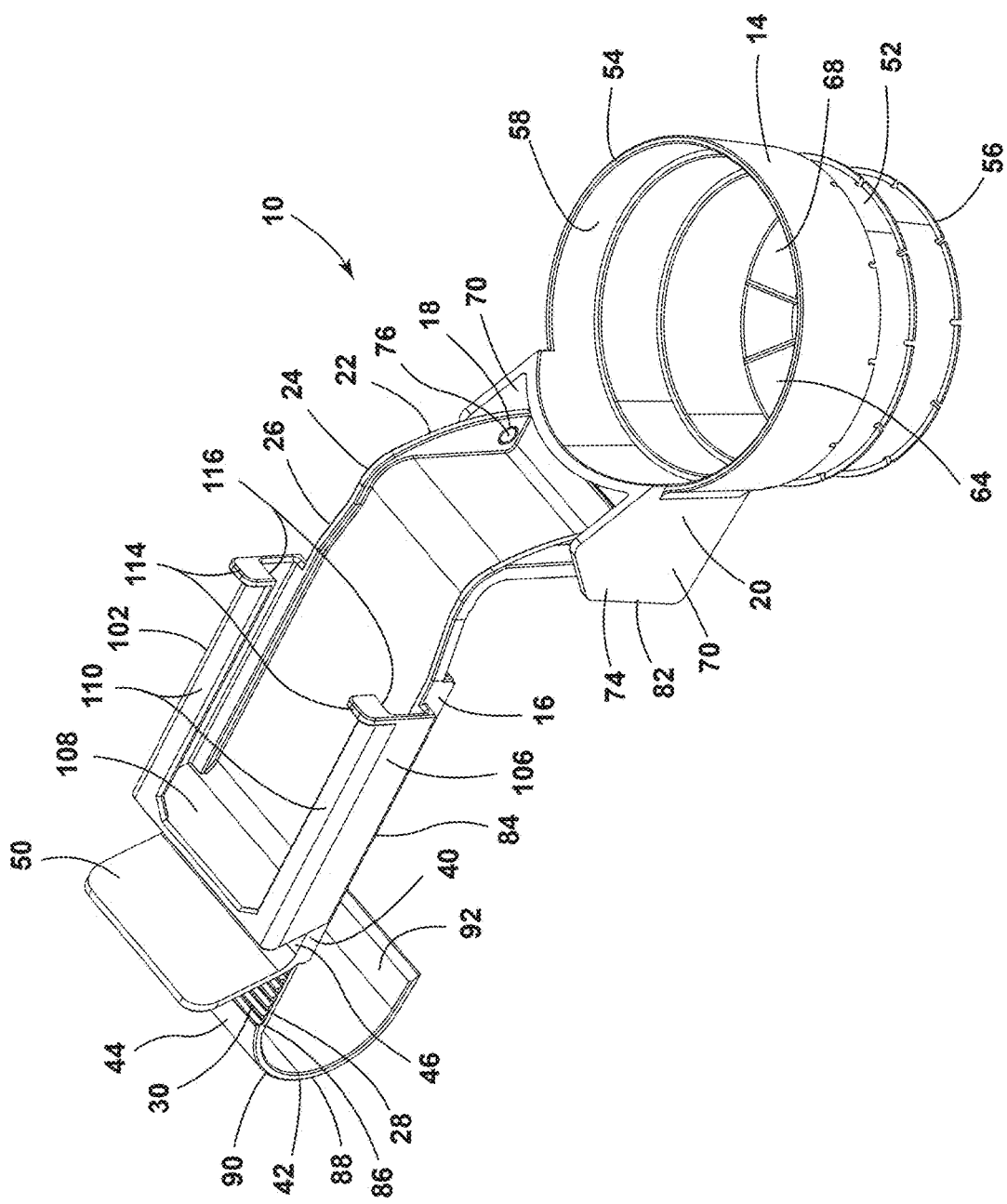
FIG. 11 is another perspective view of the beverage caddy assembly of FIG. 10 according to the first embodiment of the present disclosure.
Figure 12:
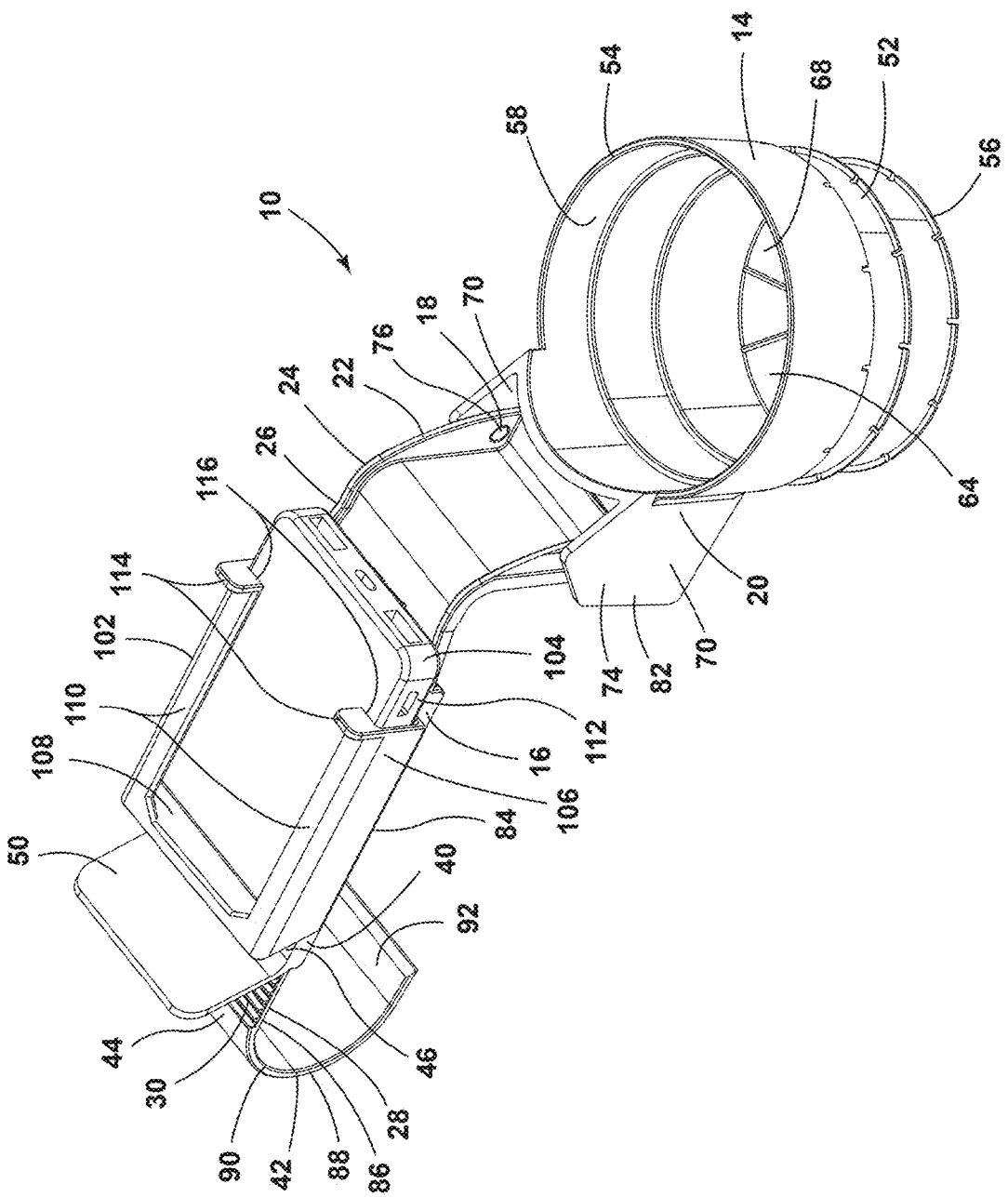
FIG. 12 is yet another perspective view of the beverage caddy assembly of FIG. 10, with the portable power module installed, according to the first embodiment of the present disclosure.
Figure 13:
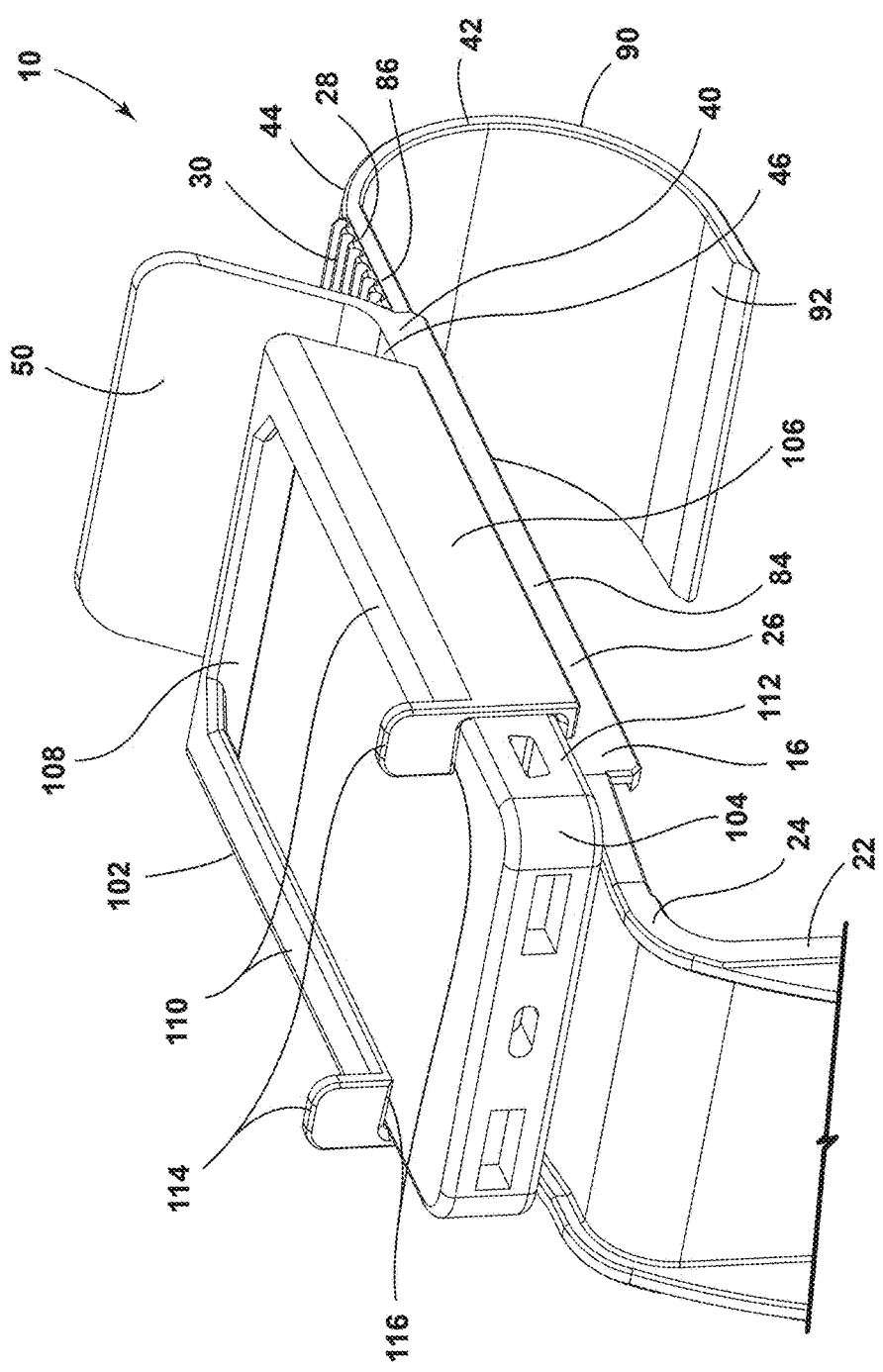
FIG. 13 is still another perspective view of the beverage caddy assembly of FIG. 10, with the portable power module installed, according to the first embodiment of the present disclosure.

A first embodiment of the beverage caddy assembly 10 may be seen in FIGS. 1-9, where the beverage caddy assembly 10 includes a collapsible cup holder 14 adapted to minimize space for transport. The collapsible cup holder 14 may be hinged for 180° rotation and may have a first position wherein the collapsible cup holder 14 may be extended relative a two-part adjustable mounting arm 16 and a second position juxtaposed against the two-part adjustable mounting arm 16. A hinge 18 may be formed between a cantilevered and inclined yoke 20 of the collapsible cup holder 14 and a forward depending portion 22 on a proximal end 24 of a first mounting arm segment 26. A second mounting arm segment 28 is coupled with the first mounting arm segment 26 by an upwardly facing interlocking rack 30 disposed along the length of an upper surface 32 of the second mounting arm segment 28. A downwardly facing interlocking rack 34 disposed along the length of a lower surface 36 of the first mounting arm segment 26 (as shown in FIG. 6A) or a pawl 38 at a distal end 40 of the first mounting arm segment 26 (as shown in FIG. 6B) may be adapted to selectively and releasably engage the upwardly facing interlocking rack 30 to provide an adjustable length of the two-part adjustable mounting arm 16 to adapt to varying gaming table rail R widths, as shown in FIGS. 1 and 10. An engagement member 42 on a distal end 44 of the second mounting arm segment 28 may be adapted to engage an inner edge IE of variable gaming table rail R width of a gaming table rail. A cell phone holder 46 may be disposed on the distal end 40 of the first mounting arm segment 26, as further discussed below.

Figures 5, 6A:
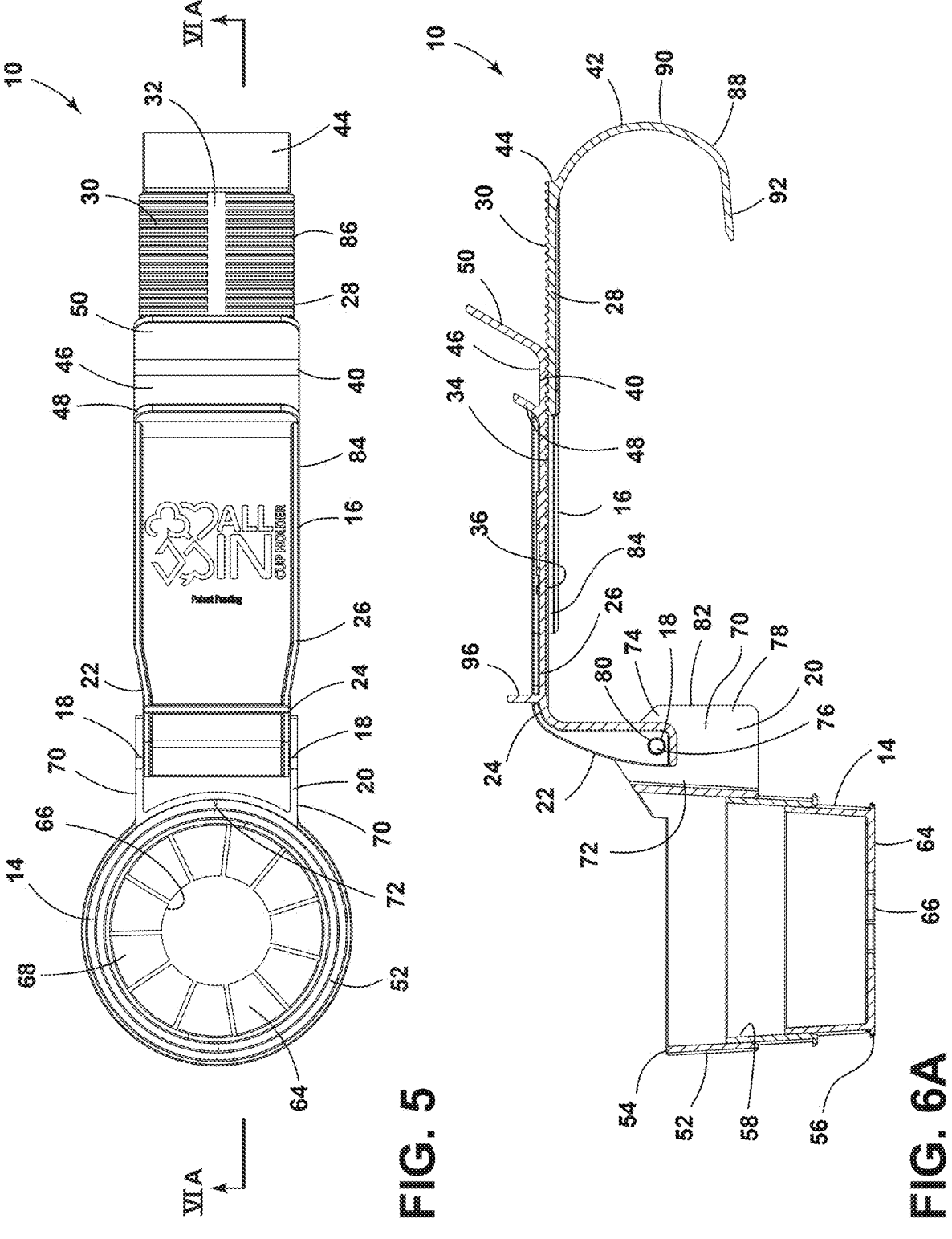
FIG. 5 is a top view of the beverage caddy assembly of FIG. 1 according to the first embodiment of the first embodiment of the present disclosure.
FIG. 6A is a cross-sectional view of the beverage caddy assembly of FIG. 1 according to the first embodiment of the present disclosure, taken along the line VIA-VIA of FIG. 5, wherein the each of the plurality of collapsible cup cylinders comprises an inward and downward taper along their vertical height.
Figure 6B:
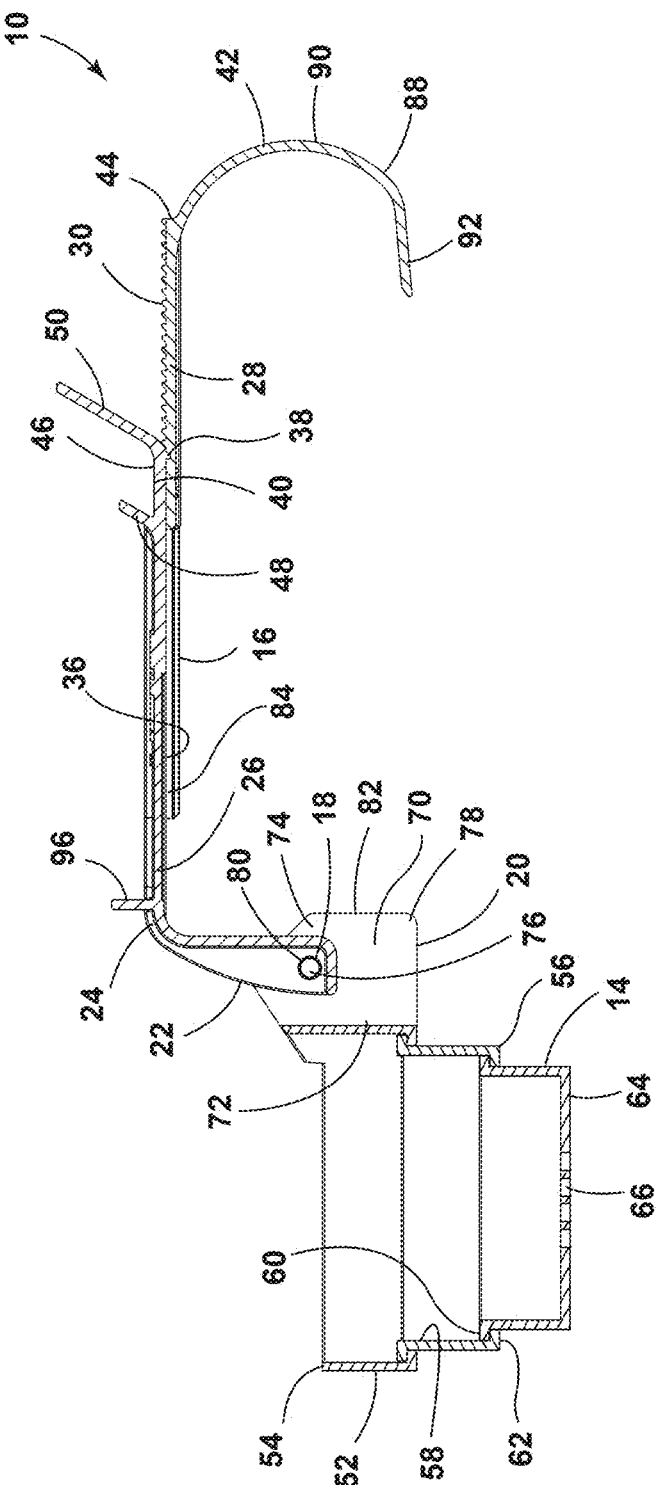
FIG. 6B is a cross-sectional view of the beverage caddy assembly of FIG. 1 according to the first embodiment of the present disclosure, taken along the line VIA-VIA of FIG. 5, wherein the plurality of concentrically disposed collapsible cup cylinders comprise an outer lip extending outwardly about an upper peripheral edge and an inner lip extending inwardly about a lower peripheral edge.
Figure 7:
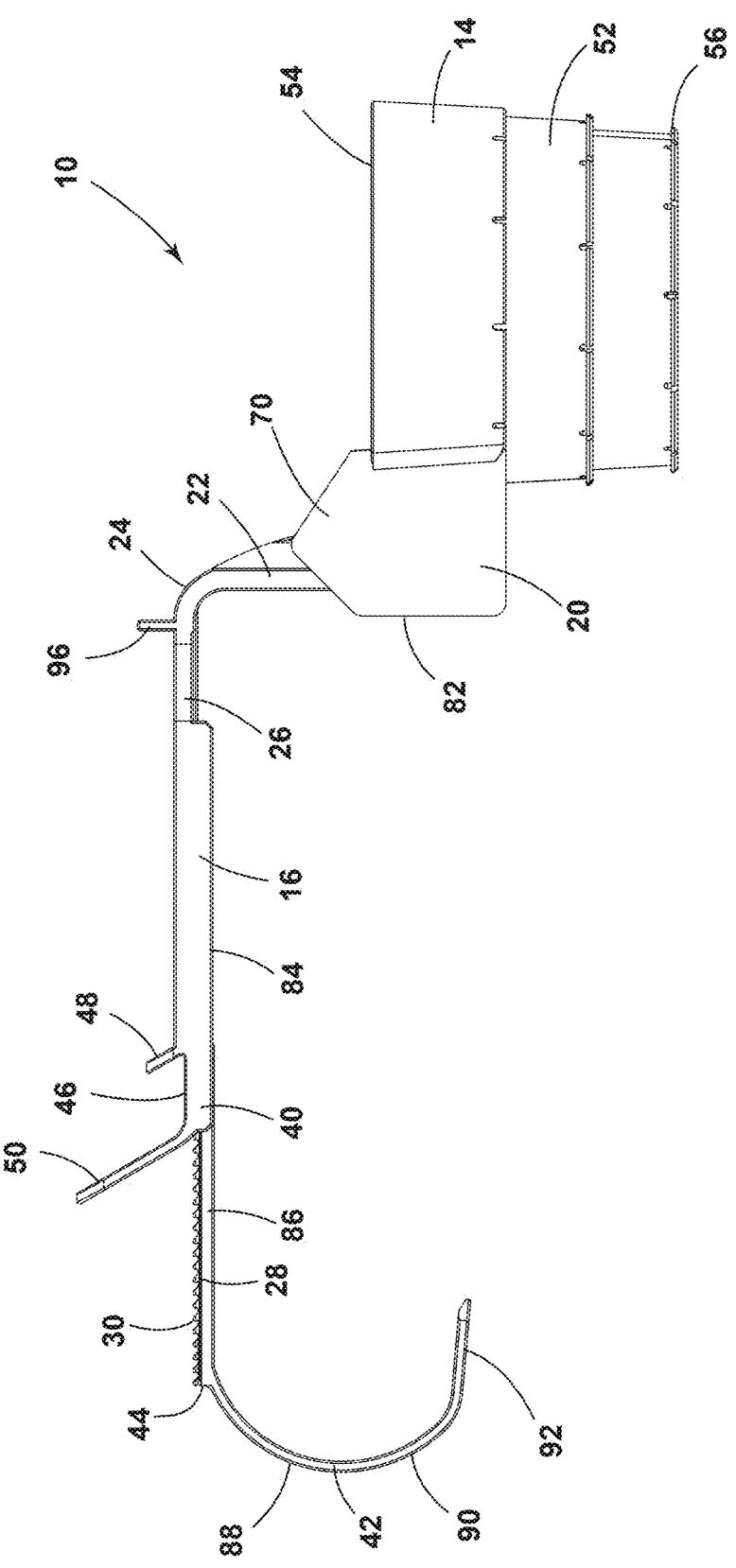
FIG. 7 is a side view of the beverage caddy assembly of FIG. 1 according to the first embodiment of the present disclosure.
Figures 8, 9:
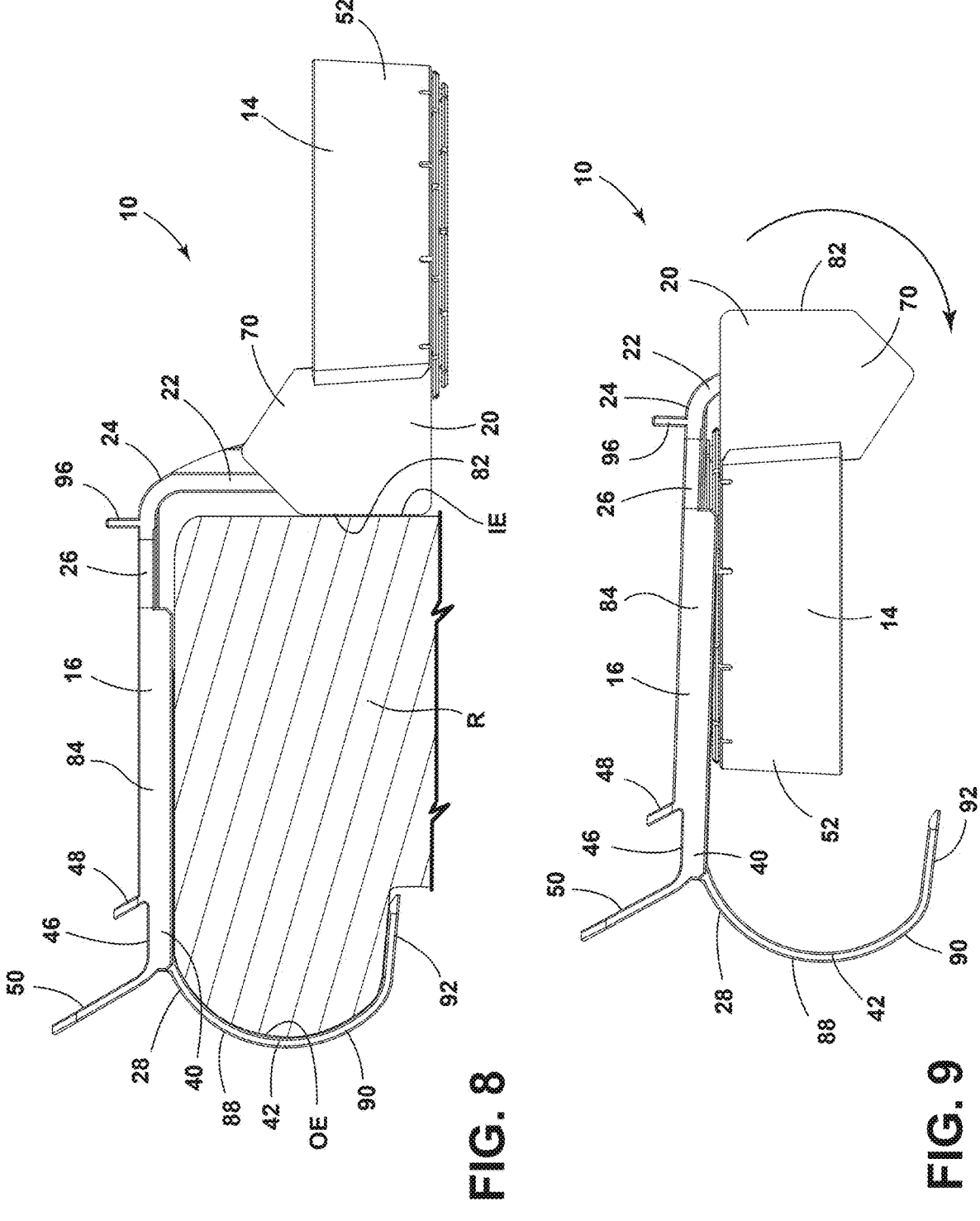
FIG. 8 is a side view of the beverage caddy assembly of FIG. 1 according to the first embodiment of the present disclosure, in the extended position.
FIG. 9 is a side view of the beverage caddy assembly of FIG. 1 according to the first embodiment of the present disclosure, in the retracted position.

As perhaps best shown in FIGS. 6A and 6B, the collapsible cup holder 14 may be constructed from a plurality of collapsible cup cylinders 52 by which the cup 12 may be supported when expanded and in use, while also minimizing the size of the beverage caddy assembly 10 for transport when collapsed. To obtain a compact collapsed configuration, the plurality of collapsible cup cylinders 52 may be concentrically oriented and of diminishing inner diameters relative to an adjacent one of the plurality of collapsible cup cylinders 52, such that the smaller of each of the plurality of collapsible cup cylinders 52 may be received with an adjacent larger one of the plurality of collapsible cup cylinders 52. That is, as shown in FIG. 9, each of the collapsible cup cylinders 52 may be arranged to nest within its larger adjacent concentrically disposed collapsible cup cylinders 52, so that in the collapsed state the collapsible cup holder 14 has a total vertical height substantially corresponding to the vertical height of the outer-most collapsible cup cylinders 52.

As perhaps best seen in FIG. 6A, each of the plurality of collapsible cup cylinders 52 may also include an inward and downward taper along their vertical height, such that a diameter of an upper peripheral edge 54 of each one of the plurality of collapsible cup cylinders 52 is larger than a diameter a lower peripheral edge 56 of the one of the plurality of collapsible cup cylinders 52. That is, as shown in FIG. 6A, the diameter of the upper peripheral edge 54 of a one of the plurality of the collapsible cup cylinders 52 upwardly adjacent another of a one of the plurality of the collapsible cup cylinders 52 may have a larger outer diameter than the diameter of the lower peripheral edge 56 of a one of the plurality of collapsible cup cylinders 52 downwardly adjacent the one of the plurality of collapsible cup cylinders 52. This configuration will allow each successive one of the plurality of collapsible cup cylinders 52 to slide upward relative its upper neighbor, but only slide downward until the upper peripheral edge 54 engages and is further downwardly restrained by the inner surface 58 of its upper neighbor.

Alternatively, or in addition to, each of the collapsible cup cylinders 52 (except the upper most collapsible cup cylinder 52) may also include an outer lip 60 extending outwardly about the upper peripheral edge 54 and an inner lip 62 extending inwardly about the lower peripheral edge 56. The outer lip 60 of the upper peripheral edge 54 may have a larger outer diameter than an inner diameter of the inner lip 62 of the lower peripheral edge 56 of the one of the plurality of concentrically disposed collapsible cup cylinders 52. The outer lip 60 extending outwardly about the upper peripheral edge 54 may thus be adapted to engage the inner lip 62 extending inwardly about the lower peripheral edge 56 of an upper adjacent one of the plurality of concentrically disposed collapsible cup cylinders 52. The lowest most collapsible cup cylinder 52 may omit the inner lip 62 extending inwardly about the lower peripheral edge 56, as discussed below.

As shown in FIGS. 1-9, three such collapsible cup cylinders 52 may be used, although any reasonable number of collapsible cup cylinders 52 may be used. When in the collapsed state, the collapsible cup cylinders 52 may be nested within each other. However, in the expanded state, the collapsible cup cylinders 52 may be allowed to fall by gravity to the expanded state shown in FIGS. 1-7. The inter-nesting sizes of the plurality of collapsible cup cylinders 52 may also be selected to provide a snug fit when collapsed, whereby a slight force or pressure may be required to extend the plurality of collapsible cup cylinders 52 to the fully expanded state.

Figure 3:
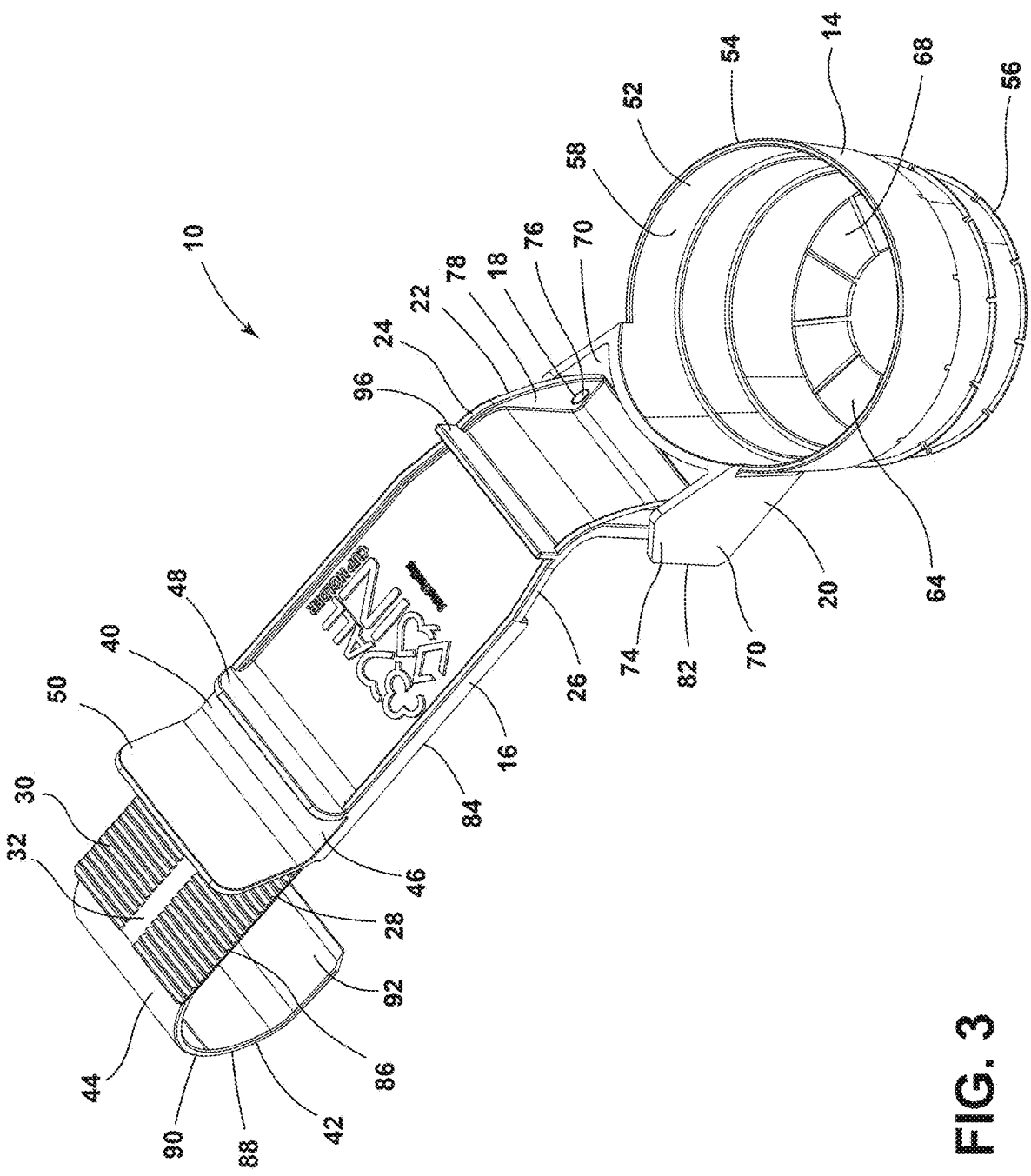
FIG. 3 is yet another perspective view of the beverage caddy assembly of FIG. 1 according to the first embodiment of the present disclosure.
Figure 4:
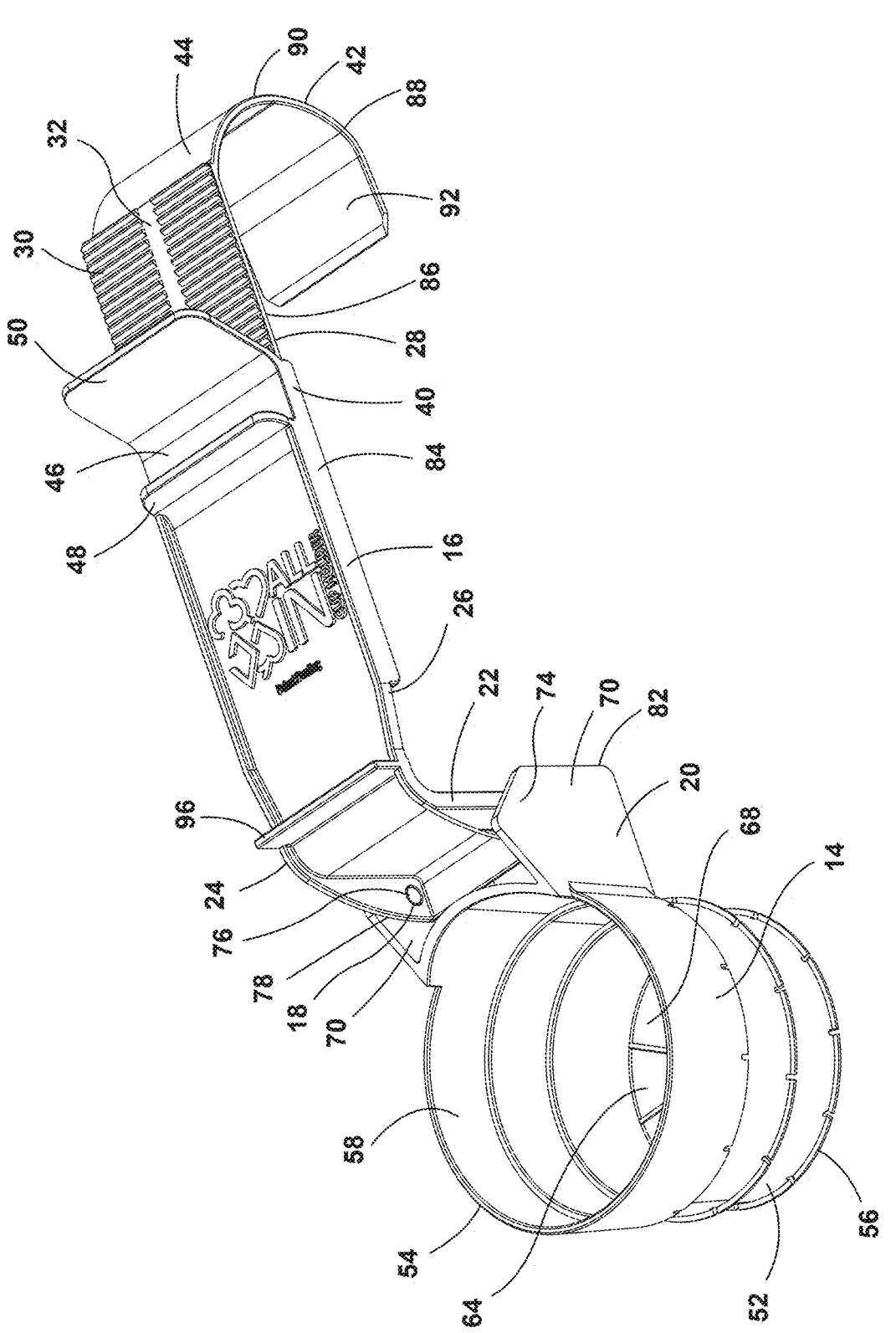
FIG. 4 is still another perspective view of the beverage caddy assembly of FIG. 1 according to the first embodiment of the present disclosure.

The lowest one of the plurality of concentrically disposed collapsible cup cylinders 52 may also include a support floor 64 upon which a cup 12 may be supported. The floor 64 may be continuous or discontinuous (i.e., having holes 66 therethrough), the latter perhaps better suited for draining condensation or spillage from the cup 12. The floor 64 may be configured as a plurality of inwardly facing pedals 68 about the lower peripheral edge 56 of the lowest one of the plurality of collapsible cup cylinders 52, as best seen in FIGS. 3 and 4. As an alternative, or an addition to, floor 64 may also be configured as a substantially continuous ring (not shown) about the lower peripheral edge 56 of the lowest one of the plurality of collapsible cup cylinders 52.

The upper one of the plurality of collapsible cup cylinders 52 may also include the yoke 20 operably coupled with the two-part adjustable mounting arm 16 arm via the hinge 18. Hinge 18 is formed between the yoke 20, which is cantilevered and inclined relative the collapsible cup holder 14, and the forward depending portion 22 on the proximal end 24 of the first mounting arm segment 26. The two-part adjustable mounting arm 16 may be thereby adapted to provide an adjustable longitudinal length and includes the first mounting arm segment 26 and the second mounting arm segment 28.

The forward depending portion 22 of the proximal end 24 of the first mounting arm segment 26 may be coupled via the hinge 18 to the yoke 20, the latter of which may include a pair of spaced ears 70 adapted to fittingly receive the forward depending portion 22 of the proximal end 24 of the first mounting arm segment 26. Each of the ears 70 may be cantilevered relative to an outer wall 72 of the upper one of the plurality of collapsible cup cylinders 52 and extends upwardly and outwardly relative thereto. At an upper end 74 of each of the ears 70, one of a pair of inwardly facing bosses 76 may be provided on an inner surface 78 of each of the ears, which may be rotatably engaged by one of a pair of holes 80 on each side of the forward depending portion 22 of the proximal end 24 of the first mounting arm segment 26, as shown in FIGS. 3, 4, 6A, and 6B. Alternatively, the inwardly facing bosses 76 may be replaced by a solid pivot pin (not shown) extending across and between the pair of spaced ears 70 and through the pair of holes 80 on each side of the forward depending portion 22 of the proximal end 24 of the first mounting arm segment 26.

As the collapsible cup holder 14 may be operably and rotatably coupled with the proximal end 24 of the first mounting arm segment 26, the collapsible cup holder 14 may be adapted for rotation between a first extended position and a second folded position disposing the collapsible cup holder 14 in juxtaposed relation with one of the first mounting arm segment 26 or second mounting arm segment 28. As shown herein, the collapsible cup holder 14 is placed in juxtaposed relation with the second mounting arm segment 28, as best seen in FIG. 9. As perhaps shown in FIG. 8, each of the pair of spaced ears 70 may be provided with an abutting edge 82 that engages an outer edge OE of a perimeter rail R about a gaming table, to maintain the collapsible cup holder 14 in the first extended position when in use. Hinge 18 may be adapted for at least 180° rotation between the first extended position and the second folded position disposing the collapsible cup holder 14 in juxtaposed relation with the second mounting arm segment 28 when not in use, as shown in FIG. 9, to facilitate ready transportation of the beverage caddy assembly 10 from one location to another.

The first mounting arm segment 26 and the second mounting arm segment 28 may be slidable relative to each other and releasably coupled one to the other, thereby providing the two-part adjustable mounting arm 16. The first mounting arm segment 26 may include one of a pair of opposed and inwardly facing resilient longitudinal side rails 84 along each side that slidingly engage one of the side edges 86 on each side of the second mounting arm segment 28, thereby allowing the first mounting arm segment 26 and the second mounting arm segment 28 to adjustably slide relative each other. Of course, the opposed and inwardly facing resilient longitudinal side rails 84 may be disposed on the second mounting arm segment 28 and may be adapted to slidingly engage one of the side edges 86 on each side of the first mounting arm segment 26.

The second mounting arm segment 28 may be releasably coupled with the first mounting arm segment 26 by the first or downwardly facing interlocking rack 34 along a length of and on the first facing or lower surface 36 of the first mounting arm segment 26 and a corresponding second or upwardly facing interlocking rack 30 along a length of and on an upper surface 32 of the second segment 28, providing the adjustable longitudinal length of the two-part adjustable mounting arm 16 for a variable gaming table rail R width. As shown in FIG. 6A, the first interlocking rack 34 and the first facing surface 36 faces downwardly and the second interlocking rack 30 and the second facing or upper surface 32 faces upwardly. That is, the upwardly facing interlocking rack 30 may be disposed along the length and on the upper surface 32 of the second mounting arm segment 28. The downwardly facing interlocking rack 34 may be disposed along the length and on a lower surface 36 of the first mounting arm segment 26 may be adapted to selectively engage the upwardly facing interlocking rack 30 to provide an adjustable length of the two-part adjustable mounting arm 16 for a varying gaming table rail R width.

Alternatively, as shown in FIG. 6B, one of the interlocking racks 30, 34 may be replaced by a pawl 38 that may be disposed on a distal end 44 of the first mounting arm segment 26 or the second mounting arm segment 28 and may be adapted to selectively engage the downwardly or upwardly facing interlocking racks 30, 34 on the other of the first mounting arm segment 26 or second mounting arm segment 28 to provide an adjustable length of the two-part adjustable mounting arm 16 for varying gaming table rail R widths. The pawl 38 may be configured as either a single tooth or a pair or more of corresponding teeth disposed at the distal end 40 of the first mounting arm segment 26 or along the length of the first mounting arm segment 26 or second mounting arm segment 28, which likewise may be adapted to correspond and engage one or more teeth of the opposed facing interlocking rack 30, 34 disposed on the first mounting arm segment 26 or second mounting arm segment 28.

The downwardly interlocking rack 34 and the upwardly facing interlocking rack 30, or the pawl 38 and opposed interlocking rack 30, 34, may be urged into engagement by the resilient longitudinal slide rails 84 along each side of the first mounting arm segment 26 that slidingly engage one of the side edges 86 on each side of the second mounting arm segment 28, thereby urging the first mounting arm segment 26 and the second mounting arm segment 28 toward each other.

Alternatively, or in addition to, one of the interlocking racks 30, 34 may be configured as a side interlocking rack 30, 34 on the side edge 86 of the second mounting arm segment 28 and the opposed interlocking rack 30, 34 or the pawl 38 may be configured as inwardly facing teeth disposed on one or either of the resilient longitudinal side rails 84 along each side of the first mounting arm segment 26, such that the side interlocking rack 30, 34 or the pawl 38 is urged into engagement with the opposed interlocking rack 30, 34 by the resilient longitudinal side rails 84. As shown in the Figures, the beverage caddy assembly 10 may further include the engagement member 42, which may include a hook 88 depending downwardly from the distal end 44 of the second mounting arm segment 28. The hook 88 may include a curvilinear sector 90 and a distal end 92 projecting toward the collapsible cup holder 14. The engagement member 42 so disposed on the distal end 40 of the second mounting arm segment 28 is particularly adapted to engage an inner edge IE of a perimeter rail R about a gaming table so equipped. While the beverage caddy assembly 10 is intended for any gaming table equipped with a perimeter rail R, it is especially intended for use in standard poker tables. By virtue of the fact that the second mounting arm segment 28 may be selectively and operably coupled with the first mounting arm segment 26 by the first and second interlocking racks 30, 34 along a length of each of the first mounting arm segment 26 and second mounting arm segment 28 or the interlocking racks 30, 34 along a length of the first mounting arm segment 26 or second mounting arm segment 28 and a corresponding pawl 38 disposed on the second mounting arm segment 28 or first mounting arm segment 26, respectively, the adjustable longitudinal length of the two-part adjustable mounting arm 16 may be adjusted to conform to virtually any a variable gaming table rail R width.

As shown in FIGS. 1-9, the beverage caddy assembly 10 may also include a cell phone holder 46 disposed on a distal end 40 of the first mounting arm segment 26. The cell phone holder 46, which may be disposed on an upwardly facing surface 94 of the first mounting arm segment 26 above the first interlocking rack 34 or pawl 38, may further include a proximal vertical support tab 96 and a first distal vertical support tab 50 defining therebetween a horizontal gap within which a cell phone may be disposed in a substantially supine position, as particularly shown in FIG. 1. In addition, a second distal vertical support tab 48 may be positioned a shorter distance from the first distal vertical support tab 50, whereby a cell phone may be disposed in a substantially upright position. As an additional benefit, the proximal vertical support tab 96 may also serve as a "hook" from which a strap of a purses or backpack may be suspended proximate the rail R of the gaming table.

In another variant of the first embodiment, wherein like reference characters of the first embodiment are used and as shown in FIGS. 10-17, the beverage caddy assembly 10 may include a portable power module mount 102 disposed on the upwardly facing surface 94 of the first mounting arm segment 26. A portable power module 104 mounted in the portable power module mount 102 may be used to recharge various electronic devices, in particular cell phones. While gaming, cell phone batteries may become discharged and it may therefore be desirable to provide some means, either brought by the gamer or provided by the gaming establishment, to recharge the cell phone battery as the gaming occurs. Such portable power modules 104 may be completely self-contained or may be powered by the gaming establishment's electrical power system.

As shown in FIGS. 10-17, the portable power module mount 102 may be disposed between the first distal vertical support tab 50 and the hinge 18 and may include a pair of opposed side walls 106 and rear wall 108 adapted to slidingly receive a portable power module 104. The side walls 106 of the portable power module mount 102 may also include a pair of opposed tangs 110 disposed on either side of the first mounting arm segment 26 and adapted to resiliently engage a pair of opposed sides 112 of the portable power module 104. As can be seen, the ports on the power module 104 are exposed as necessary to plug the cables in for charging. A pair of proximal vertical support tabs 114 may be provided on each proximal end 116 of the side walls 106 of the portable power module mount 102, to support a cell phone that may be disposed in a substantially supine position. The rear wall 108 of the portable power module mount 102, in place of the second distal vertical support tab 48 of the first embodiment, may be used to support a cell phone in a substantially upright position.

Figures 14, 15:
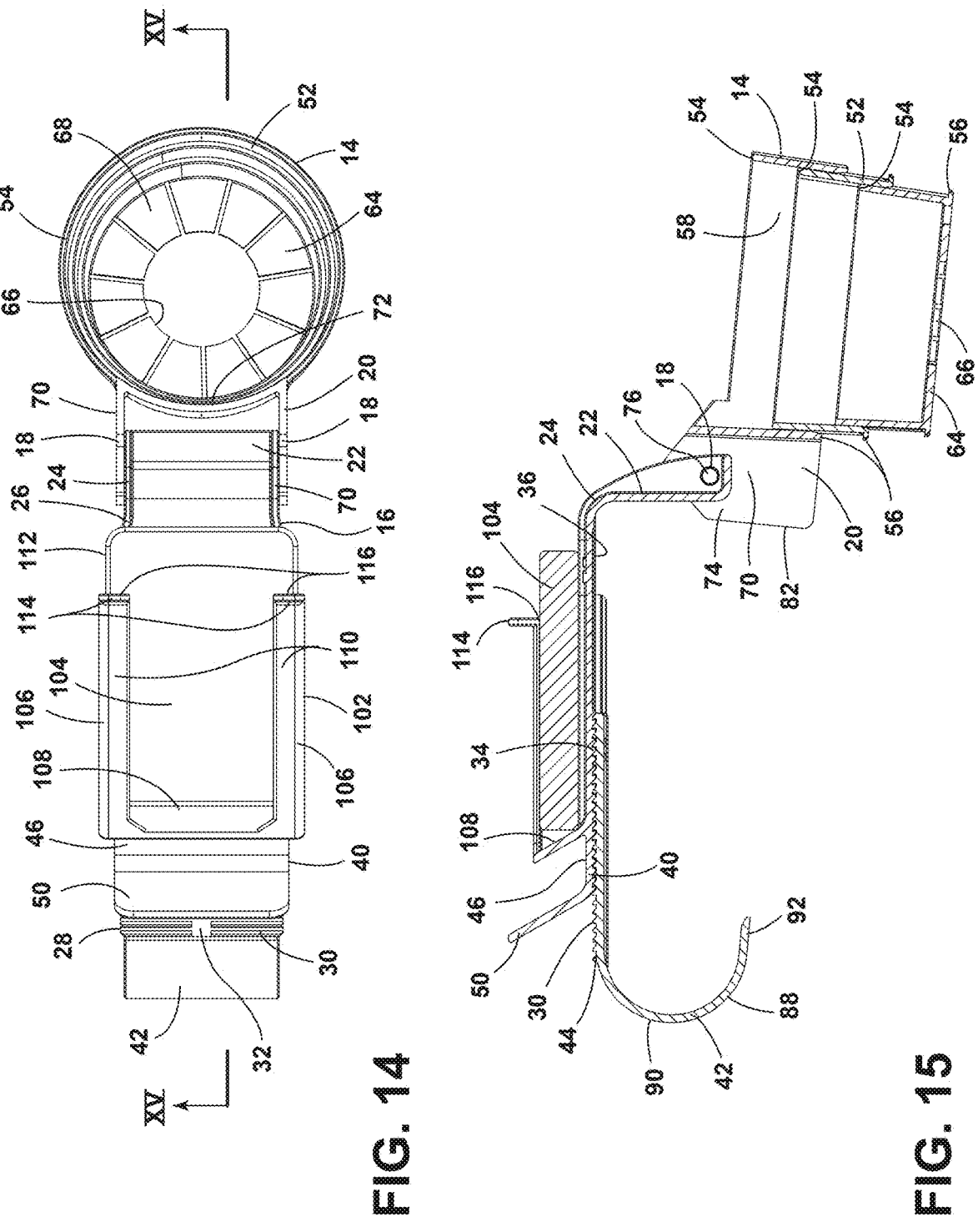
FIG. 14 is a top view of the beverage caddy assembly of FIG. 10 according to the first embodiment of the present disclosure.
FIG. 15 is a cross-sectional view of the beverage caddy assembly of FIG. 10 according to the first embodiment of the present disclosure, taken along the line XV-XV of FIG. 14.
Figures 16, 17:
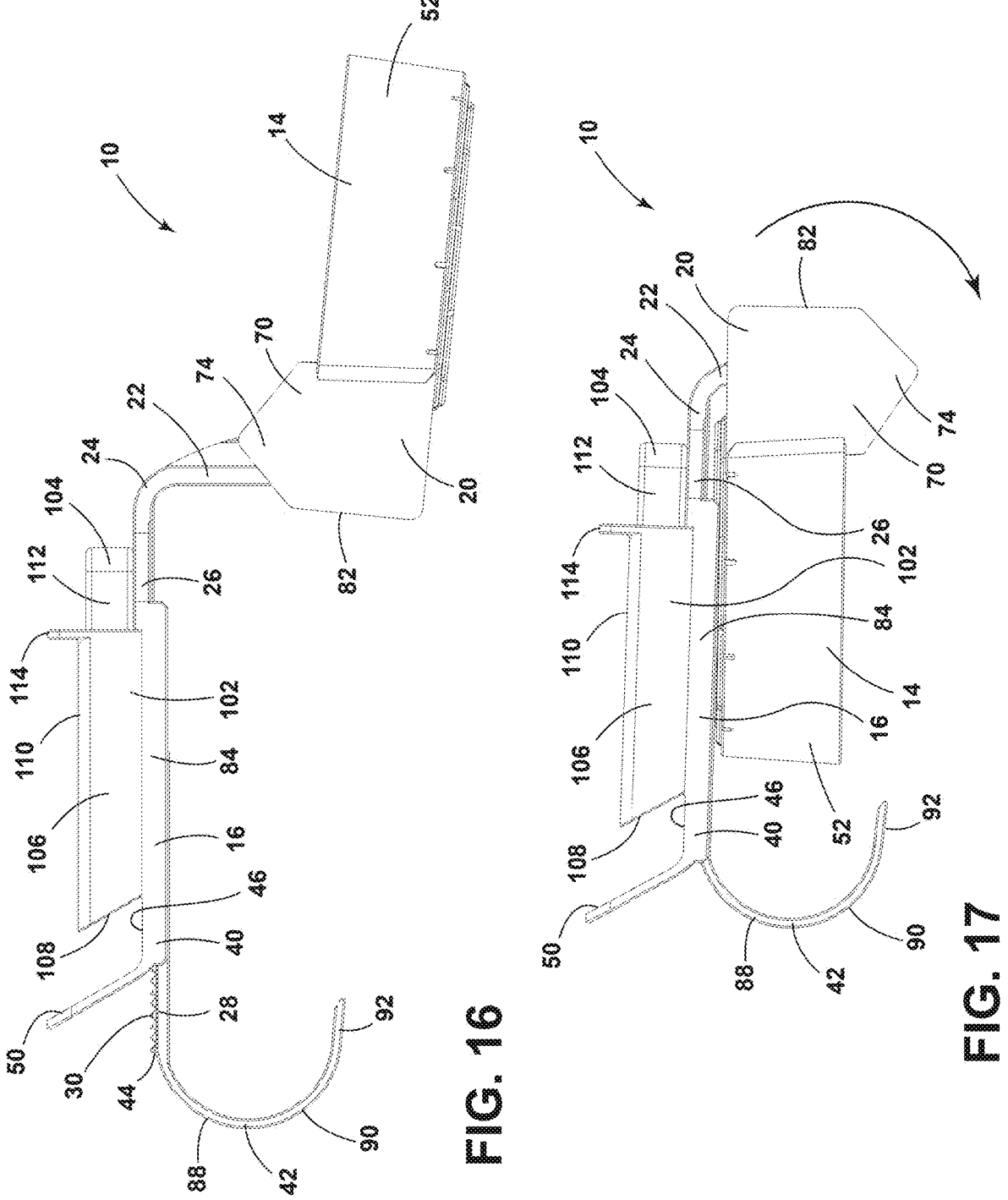
FIG. 16 is a side view of the beverage caddy assembly of FIG. 10 according to the first embodiment of the present disclosure, in the extended position.
FIG. 17 is a side view of the beverage caddy assembly of FIG. 10 according to the first embodiment of the present disclosure, in the retracted position.

As described above, the beverage caddy assembly 10 may be adapted to assume a deployed configuration in which the collapsible cup holder 14 is in the fully extended position, the hinge 18 is in a first extended position, and the adjustable longitudinal length of the two-part adjustable mounting arm 16 is between the fully folded position and the fully extended position or in the fully extended position, as shown, for example, in FIGS. 15 and 16. Conversely, the beverage caddy assembly 10 may be adapted to assume a collapsed configuration, in which the collapsible cup holder 14 is in the fully collapsed position, the hinge 18 is in a second folded position, and the adjustable longitudinal length of the two-part adjustable mounting arm 16 is in the fully folded position, as shown in FIG. 17.

Most of the components of the beverage caddy assembly 10 may be fabricated from metal, polymers, or any combination thereof. The pair of opposed and inwardly facing resilient longitudinal side rails 84 along each side edge 86 of one or other of the first and second mounting arm segments 26, 28 of the two-part adjustable mounting arm 16 may best be fabricated from a polymer, such as glass-filled nylon, which may be best adapted to provide the desired resiliency. In operation, a cup or beverage vessel 12 may be readily supported from a perimeter rail R about a table so equipped for use by the beverage caddy assembly 10 herein disclosed. The beverage caddy assembly 10 is easily transported, as it may be readily manipulated to assume the collapsed configuration in which the collapsible cup holder 14 is in the fully collapsed position, wherein the collapsible cup holder 14 is operably coupled with a proximal end 24 of a first mounting arm segment 26 of the two-part adjustable mounting 16, wherein the collapsible cup holder 14 is adapted for rotation between the first extended position and the second folded position about the hinge 18, placing the collapsible cup holder 14 in juxtaposed relation with the second mounting arm segment 28 of the two-part adjustable mounting 16, as shown in FIGS. 9 and 17.

The beverage caddy assembly 10 may then be expanded to a deployed configuration in which the collapsible cup holder 14 is in a fully expanded position and rotated to the first extended position about the hinge 18, and the part adjustable longitudinal length of the two-part adjustable mounting arm 16 may be adjusted to a position between a fully folded position and the fully extended position or in the fully extended position. The engagement member 42 on the distal end 40 of the second mounting arm segment 28 may be then disposed over and about an inner edge IE of the perimeter rail of the table, where the second mounting arm segment 28 is selectively and operably coupled with the first mounting arm segment 26 by the pair of opposed interlocking racks 30, 34 along the length of the first mounting arm segment 26 and second mounting arm segment 28 or a pawl 38 on the first mounting arm segment 26 or second mounting arm segment 28, respectively. The beverage caddy assembly 10 may thus provide an adjustable longitudinal length of the two-part adjustable mounting arm 16 between the fully extended position and the fully folded position. By so fixing the relative position of the first mounting arm segment 26, the second mounting arm segment 28, and engagement member 42 over and about an inner edge IE of the perimeter rail R of the table, the beverage caddy assembly 10 may releasably locked to the table and thereby provide a reasonably stable and secure location to store a cup 12 when not in use.

A second embodiment of the beverage caddy assembly 10 may be seen in FIGS. 18-23 and is particularly adapted for use with a gaming machine GM, such as a slot machine. The same reference numbers for the same or similar structures as those used in the first embodiment described above have been employed, unless noted differently. A description of substantially identical structures and features is omitted.

The beverage caddy assembly 10 again includes a collapsible cup holder 14 that may be adapted to minimize space for transport. The collapsible cup holder 14 again may be hinged for 180° rotation about a hinge 118 relative a mounting arm 120. The collapsible cup holder 14 and the mounting arm 120 may be constructed as unibody components and may be injection molded as such from a polymeric material, such as glass-filled nylon.

Figure 18:
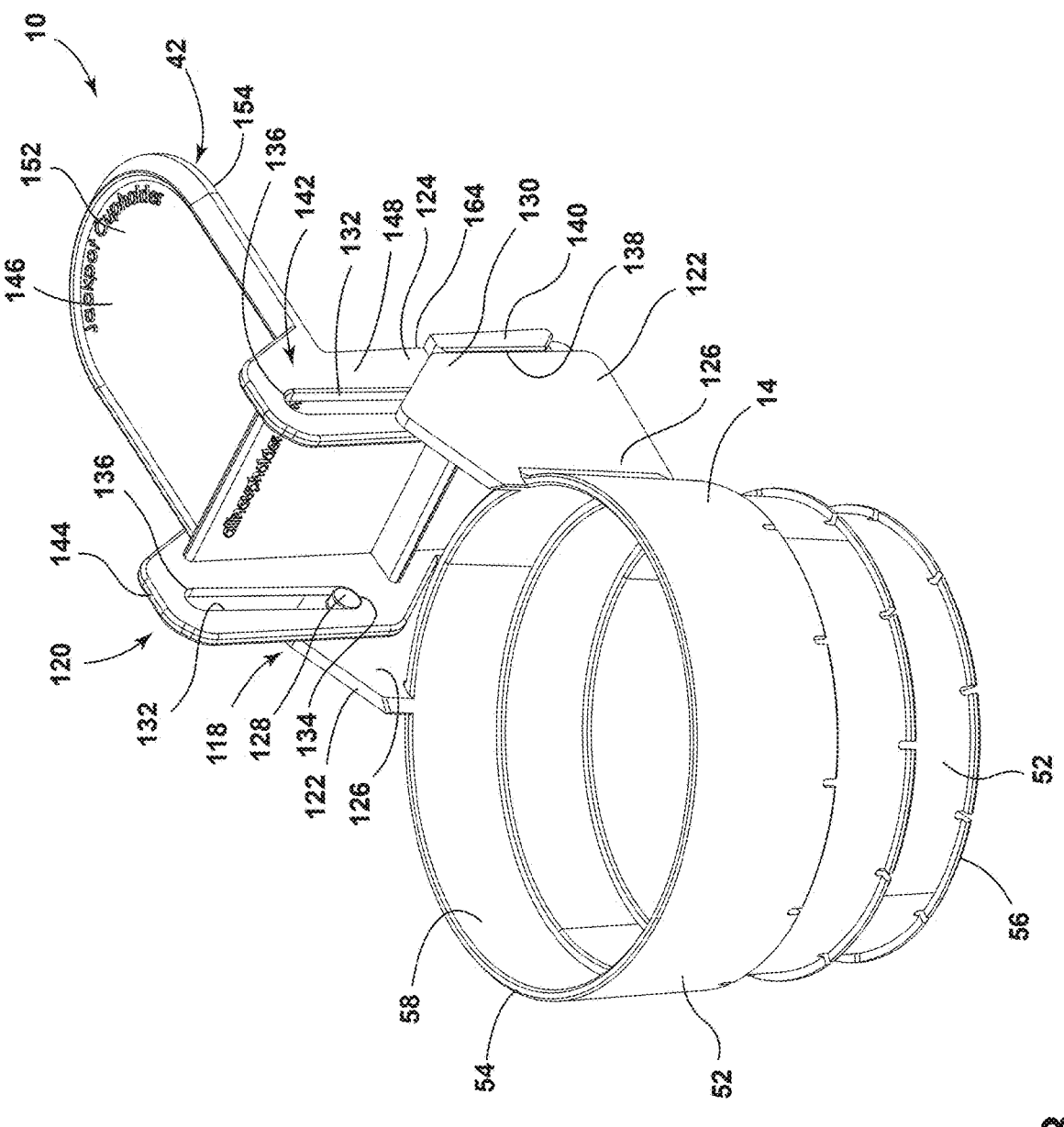
FIG. 18 is a perspective view of a second embodiment of the beverage caddy assembly according to the present disclosure, in the extended position.

The mounting arm 120 may include a pair of first mounting arm segments 122 and a second mounting arm segment 124 moveable relative to the first mounting arm segments 122. A proximal end 126 of each of the pair of first mounting arm segments 122 may be rigidly coupled with the collapsible cup holder 14 and may in fact be integrally molded with the collapsible cup holder 14, as shown in FIG. 18. The hinge 118 is essentially defined by a pair of inwardly facing and opposed hinge pins 128 that may be disposed on a distal end 130 of each one of the pair of first mounting arm segments 122, respectively. Hinge 118 further includes a pair of elongated slots 132 that may be disposed on the second mounting arm segment 124, within which the pair of opposed hinge pins 128 may be rotatably and slidingly received.

Figure 19:
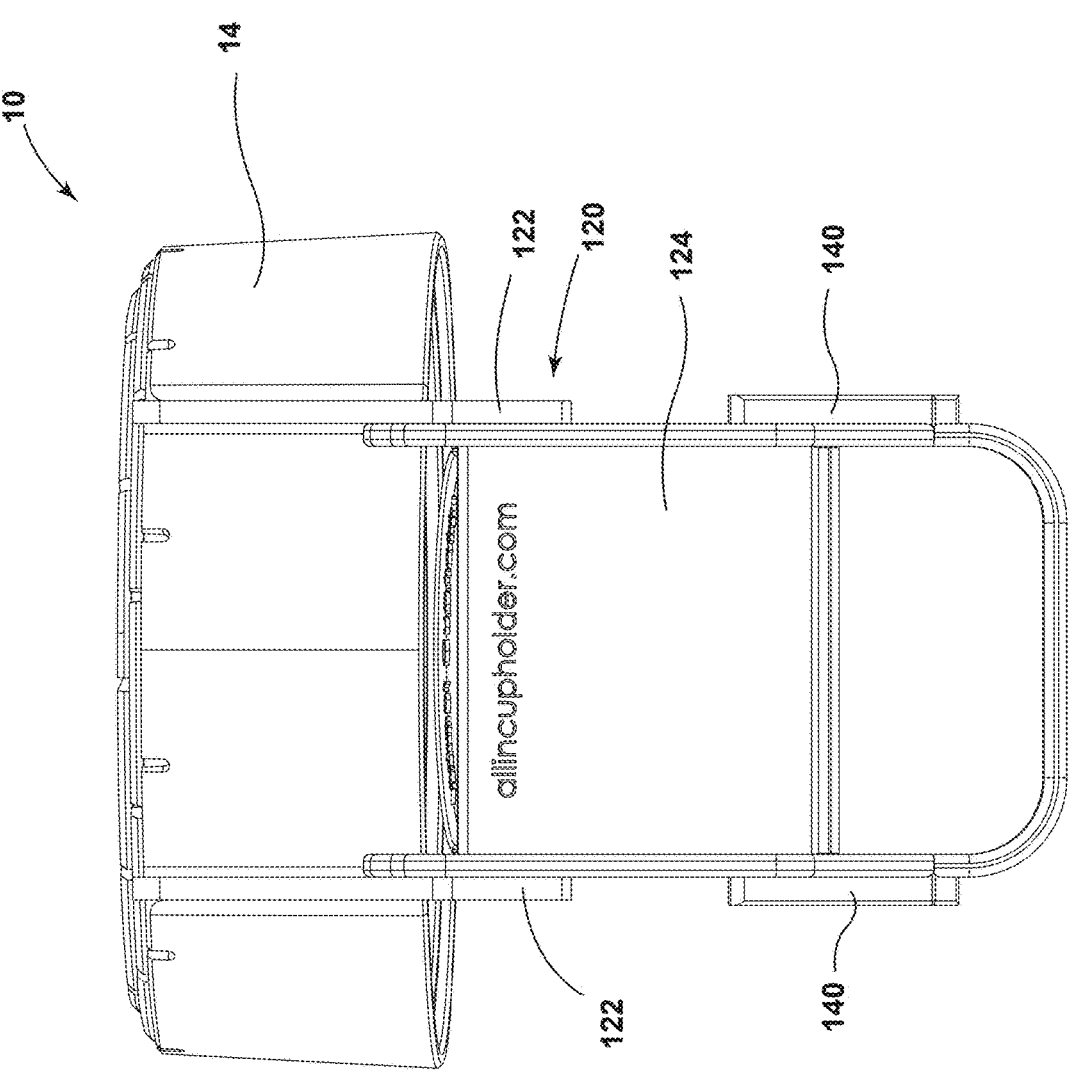
FIG. 19 is a front view of the beverage caddy assembly of FIG. 18 according to the second embodiment of the present disclosure, in the folded position.
Figure 20:
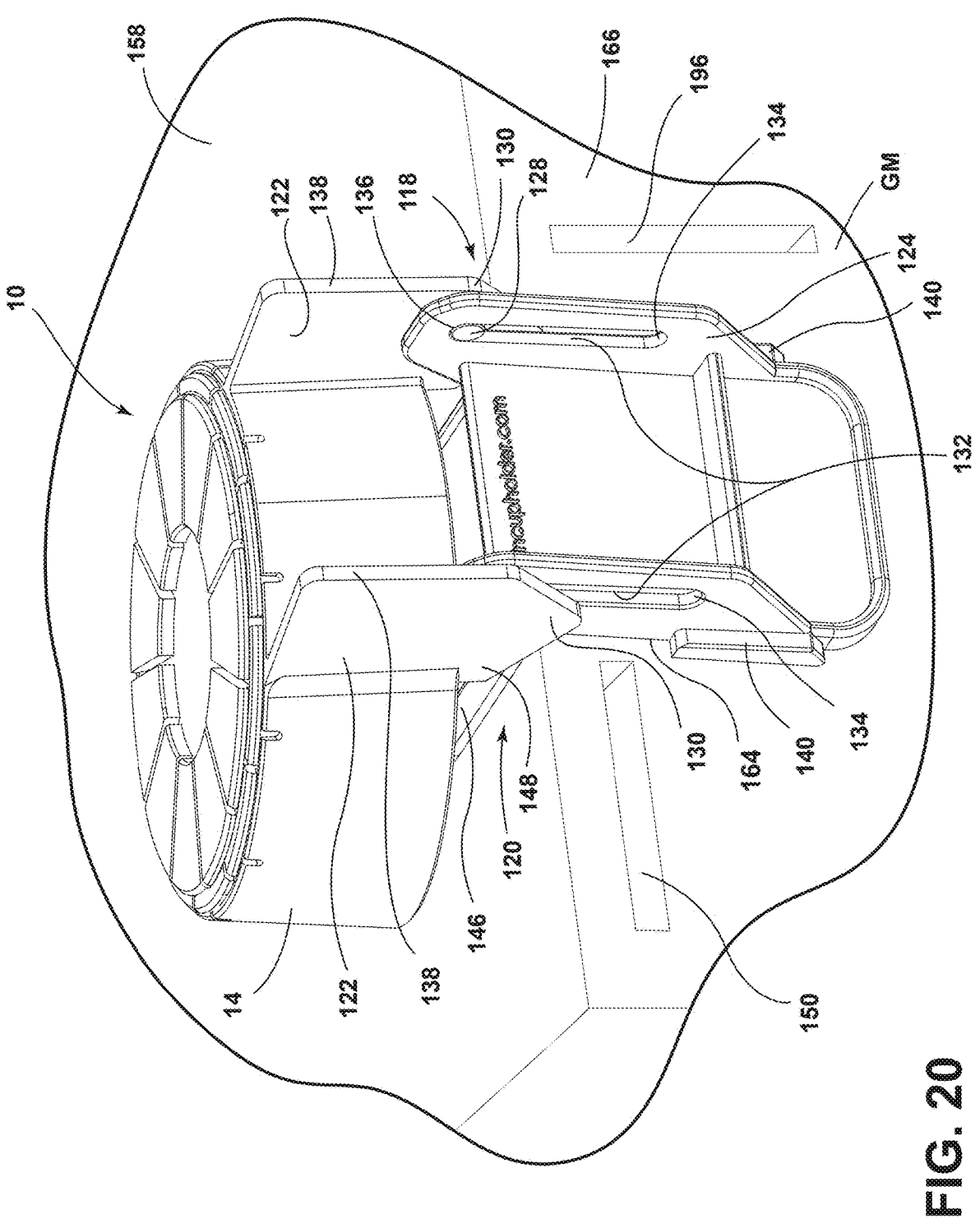
FIG. 20 is a front perspective view of the beverage caddy assembly of FIG. 18 according to the second embodiment of the present disclosure, in the folded position.
Figure 21:
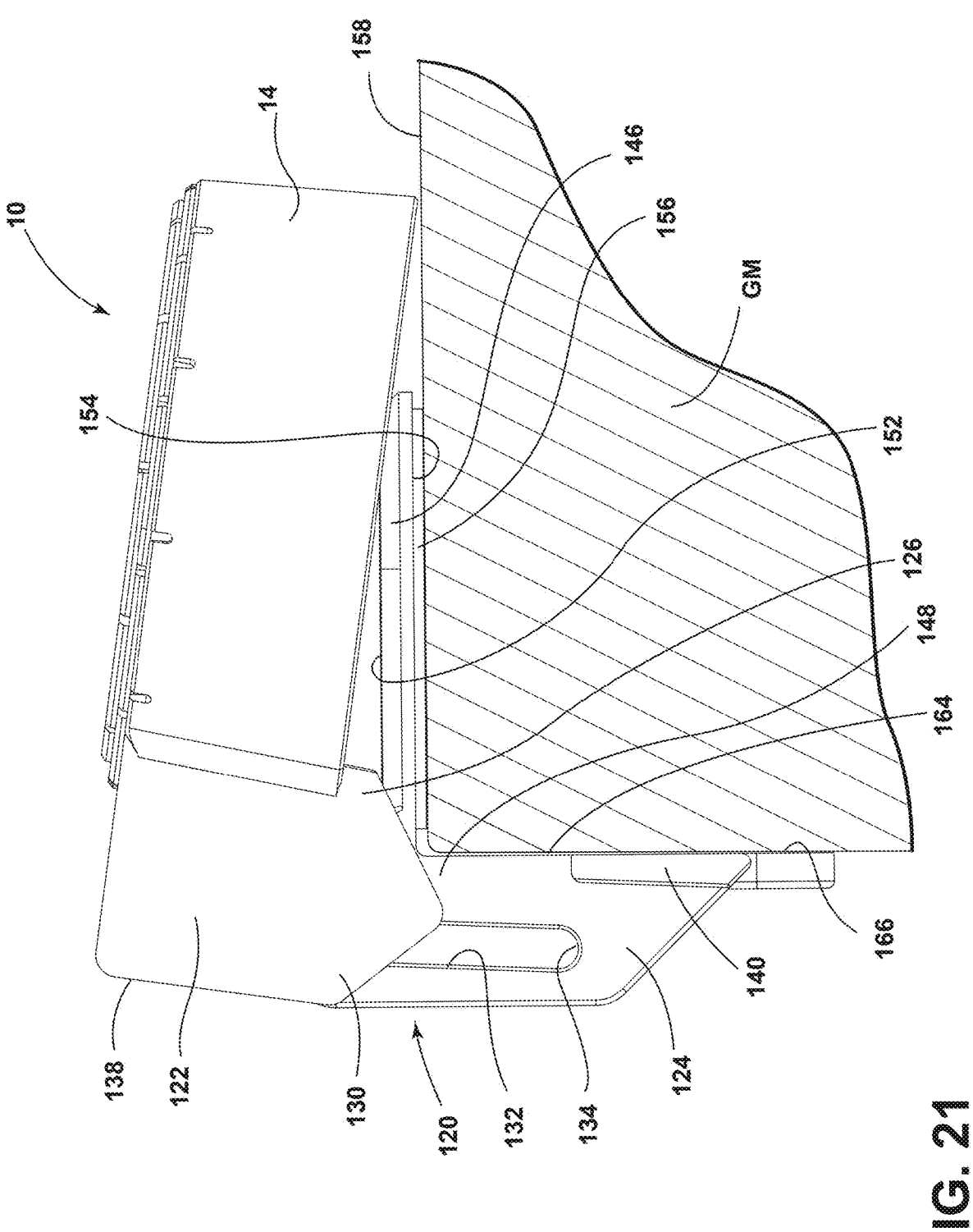
FIG. 21 is a side perspective view of the beverage caddy assembly of FIG. 18 according to the second embodiment of the present disclosure, in the folded position.
Figure 22:
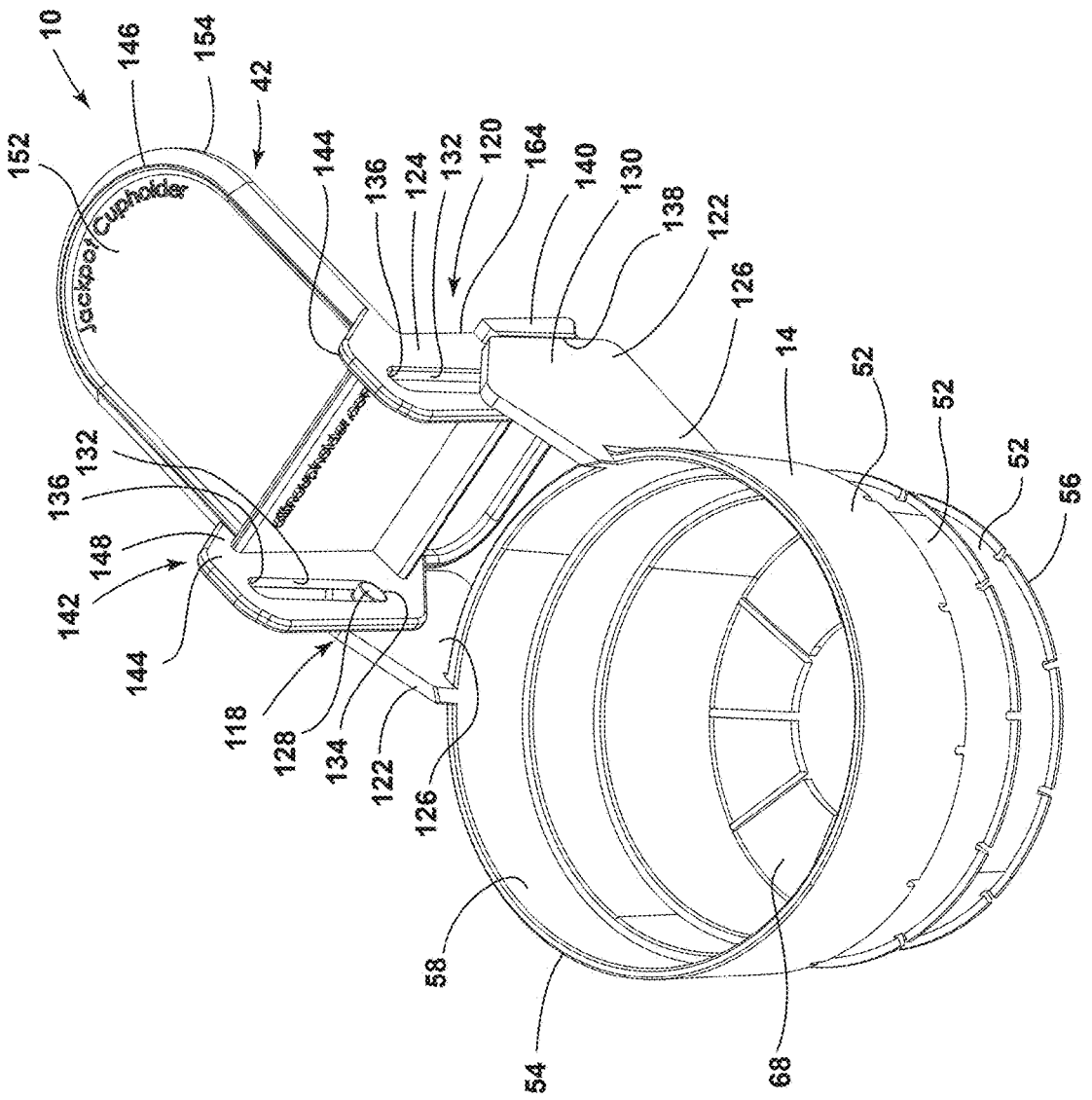
FIG. 22 is a front perspective view of the beverage caddy assembly of FIG. 18 according to the second embodiment of the present disclosure, in the extended position.
Figure 23:
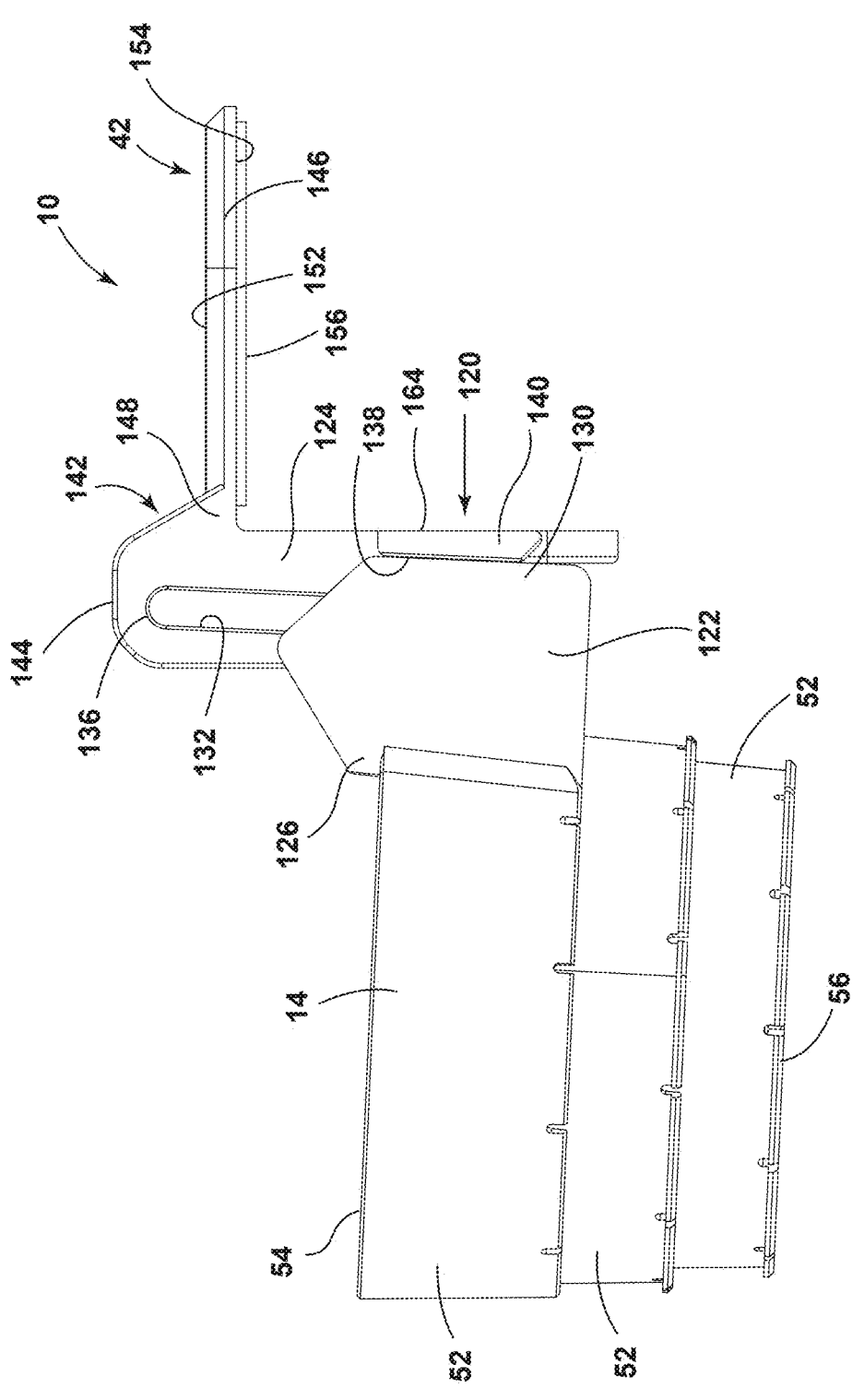
FIG. 23 is a front perspective view of the beverage caddy assembly of FIG. 18 according to the second embodiment of the present disclosure, in the folded position.

The collapsible cup holder 14 may thus be adapted for rotation between a first extended position (as shown in FIGS. 18, 22, and 23) and a second folded position disposing the collapsible cup holder 14 in juxtaposed relation with the second mounting arm segment 124 (as shown in FIGS. 19, 20, and 21). As shown in FIGS. 18, 22, and 23, the pair of opposed hinge pins 128 may be disposed proximate a first end 134 of the pair of elongated slots 132 when in the first extended position. Likewise, as shown in FIGS. 19, 20, and 21, the pair of opposed hinge pins 128 may be disposed proximate a second end 136 of the pair of elongated slots 132 when in the second folded position. The pair of first mounting arm segments 122 and the collapsible cup holder 14 may be thus operably coupled with the second mounting arm segment 124. The collapsible cup holder 14 and the first mounting arm segments 122 are adapted for at least 180° rotation between the first extended position and the second folded position, wherein, when in the second folded position, the collapsible cup holder 14 is disposed in juxtaposed relation with the second mounting arm segment 124 when not in use.

As a structure for stabilizing the collapsible cup holder 14 when in the first extended position, each of the pair of first mounting arm segments 122 may further include an abutting edge 138 adapted to engage an anchor tab 140 disposed on opposed sides of the second mounting arm segment 124, as shown in FIGS. 18, 22, and 23, to maintain the collapsible cup holder 14 in the first extended position when in use. This structural configuration may be particularly advantageous in supporting the weight of a beverage placed within the collapsible cup holder 14.

The beverage caddy assembly 10 may further include a purse retainer 142 disposed on the second mounting arm segment 124. As perhaps best shown in FIG. 18, the purse retainer 142 may be configured as a pair of raised shoulders 144 on opposed sides of the second mounting arm segment 124, although other configurations may be employed.

An engagement member 42 may be disposed on the second mounting arm segment 124 and adapted for engaging the gaming machine GM. In this second embodiment of the beverage caddy assembly 10, the engagement member 42 may include a mounting leg 146 fixedly coupled with and extending orthogonally from an upper and distal portion 148 of the second mounting arm segment 124 and proximate the second end 136 of the pair of elongated slots 132. The mounting leg 146 may be integrally molded with the second mounting arm segment 124, as shown in FIGS. 18-23.

In one variant of the second embodiment, the mounting leg 146 may be adapted for mounting the beverage caddy assembly 10 within a horizontal slot 150 provided in the gaming machine GM, as shown in FIG. 20. In this configuration, with the beverage caddy assembly 10 in the first extended position, the mounting leg 146 of the beverage caddy assembly 10 may be simply and fully inserted into the horizontal slot 150 in the gaming machine GM and the beverage caddy assembly 10 may then be released as ready to receive a beverage within the collapsible cup holder 14.

Alternatively, the mounting leg 146 further may include an upper face 152 and a lower face 154 and at least one layer of double-sided tape 156 (such as high-strength, double-sided acrylic foam tapes sold by 3M under the trademark "VHB") disposed on the lower face 154 of the mounting leg 146. In this configuration, double-sided tape 156 may be adapted for semi-permanently affixing the beverage caddy assembly 10 to an exposed horizontal surface 158 of the gaming machine GM, as perhaps best shown in FIG. 21.

Figure 24:
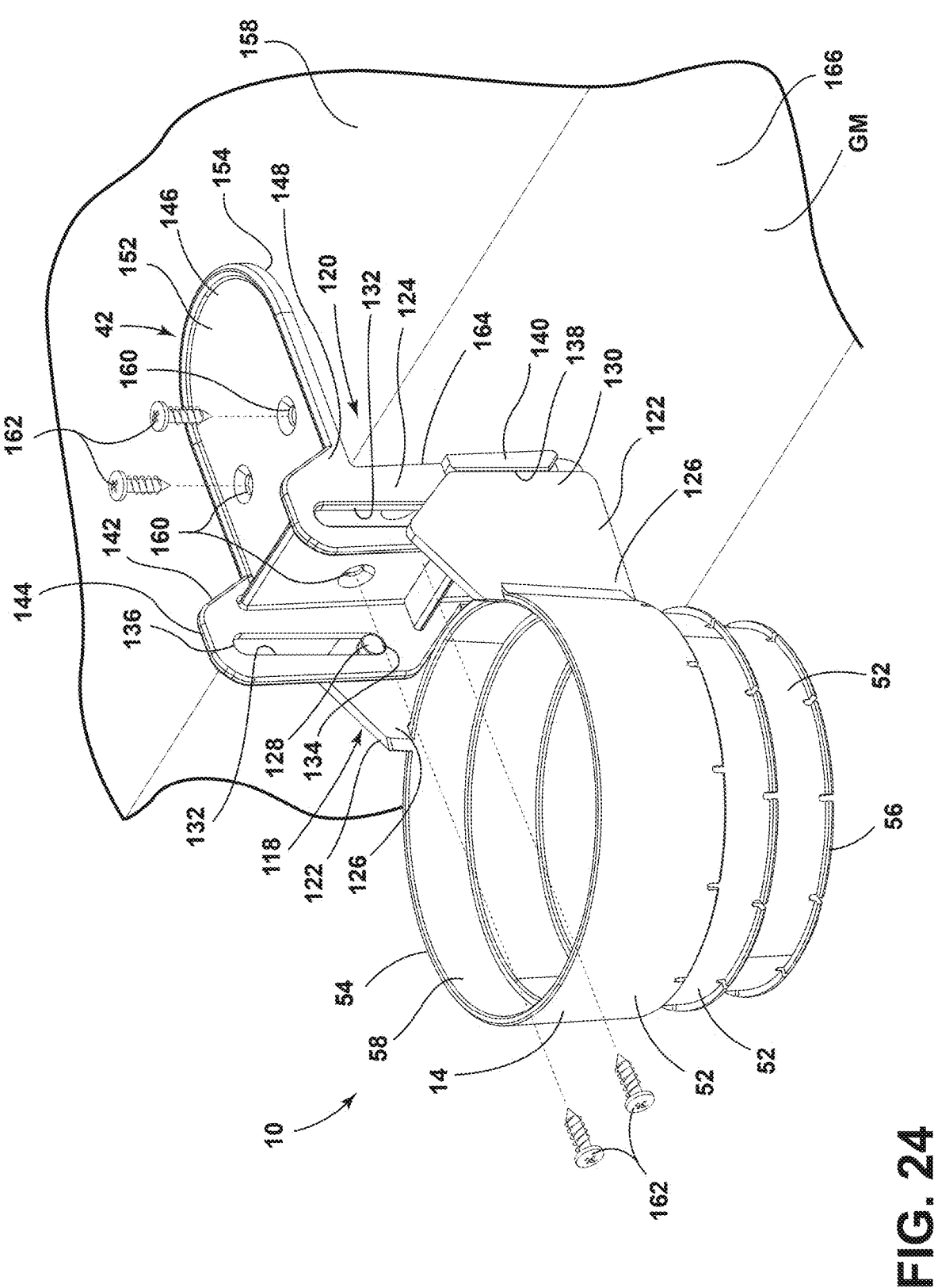
FIG. 24 is a perspective view of a third embodiment of the beverage caddy assembly according to the present disclosure, in the extended position.
Figure 25:
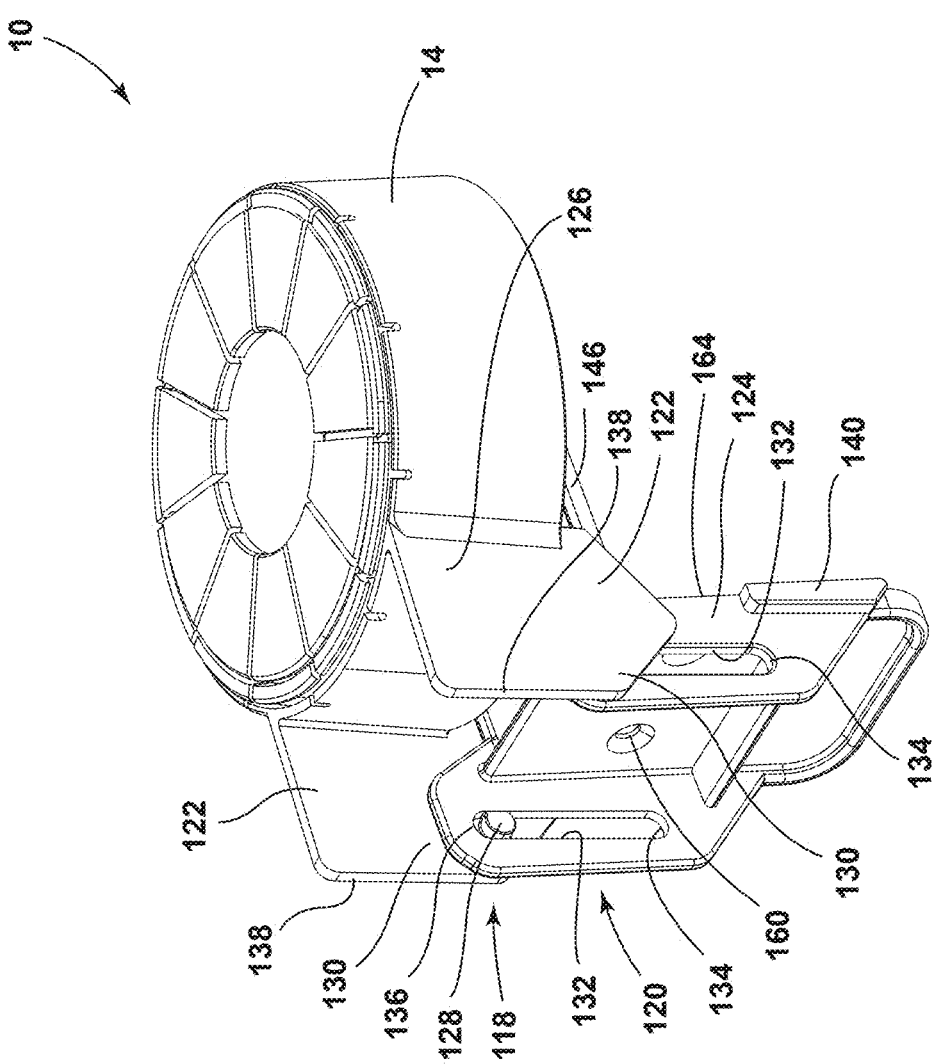
FIG. 25 is a front perspective view of the beverage caddy assembly of FIG. 24 according to the third embodiment of the present disclosure, in the folded position.

A third embodiment of the beverage caddy assembly 10 may be seen in FIGS. 24-25. Again, the same reference numbers for the same or similar structures as those used in the first and second embodiments described above have been employed, unless noted differently. A description of substantially identical structures and features is omitted.

In the third embodiment of the beverage caddy assembly 10, the mounting leg 146 may also include the upper face 152 and the lower face 154 and at least one fastener opening 160 through the upper and lower face 152, 154 of the mounting leg 146 by which at least one fastener 162 may be disposed for attachment of the lower face 154 of the mounting leg 146 of the beverage caddy assembly 10 against the exposed upper horizontal surface 172 of the gaming machine GM. As shown in FIGS. 24-25, a pair of fastener openings 160 and fasteners 162 may be employed. In addition, the second mounting arm segment 124 may also include at least one fastener opening 160 by which at least one fastener 162 may be disposed for attachment of a distal face 164 of the second mounting arm segment 124 of the beverage caddy assembly 10 against to an exposed vertical surface 166 of the gaming machine GM. Again, as shown in FIGS. 24, a pair of fastener openings 160 and fasteners 162 may be employed. This embodiment likewise may be adapted for semi-permanently affixing the beverage caddy assembly 10 to the exposed horizontal surface 158 and vertical surface 166 of the gaming machine GM, as perhaps best shown in FIG. 24.

Figure 26:
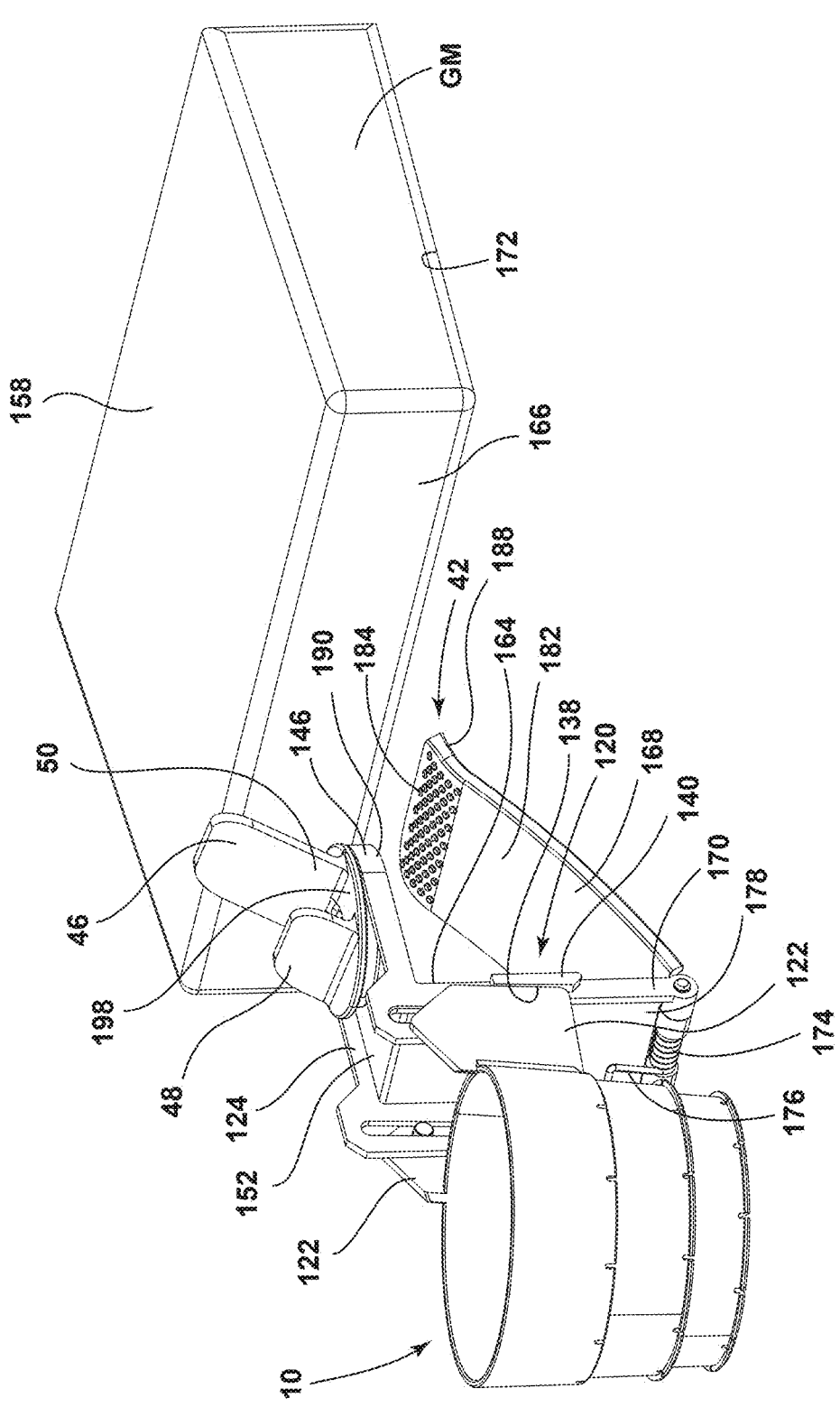
FIG. 26 is a perspective view of a fourth embodiment of the beverage caddy assembly according to the present disclosure, in the extended position.
Figure 27:
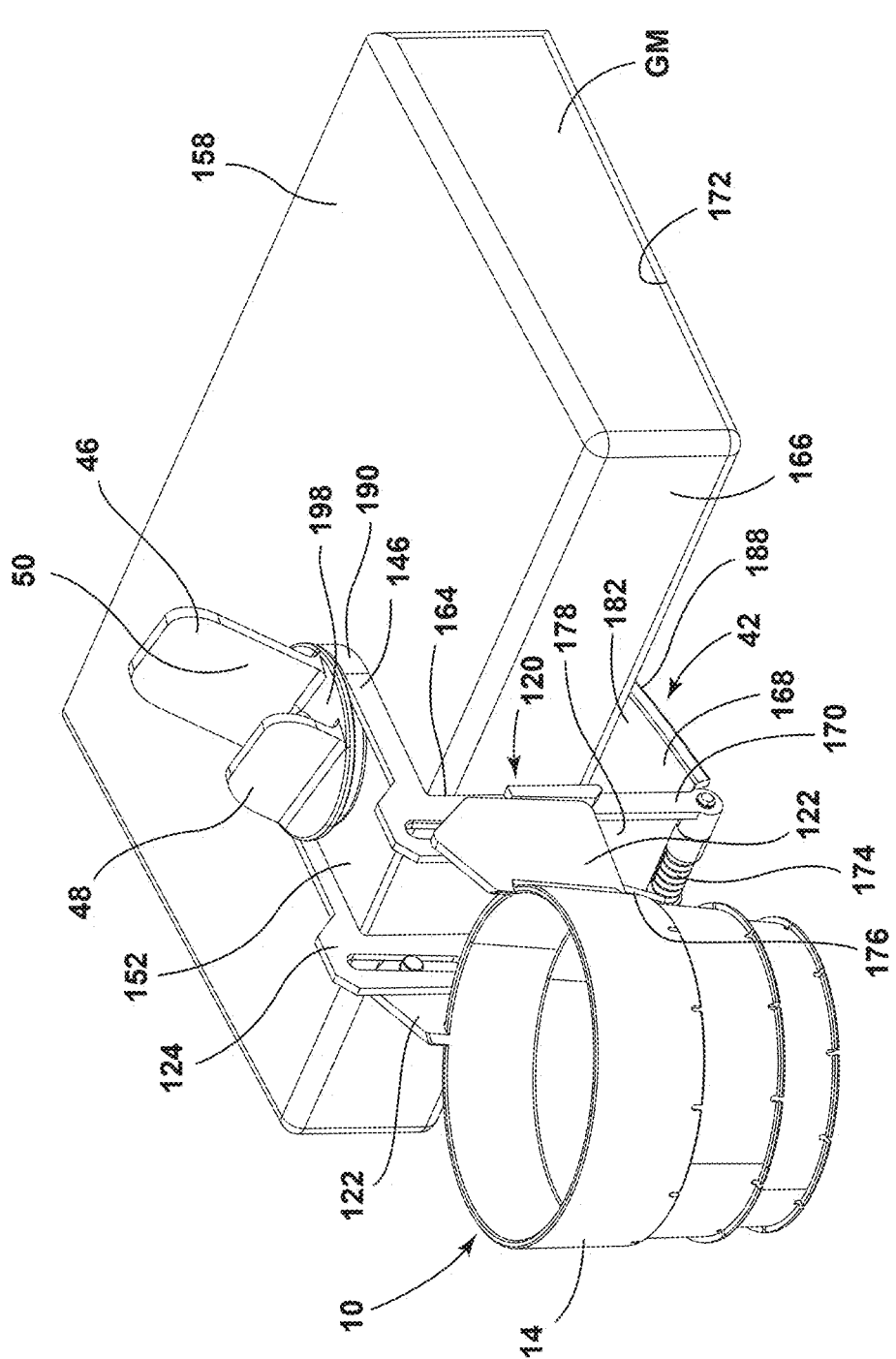
FIG. 27 is a front perspective view of the beverage caddy assembly of FIG. 26 according to the fourth embodiment of the present disclosure, in the extended and installed position.
Figure 28:
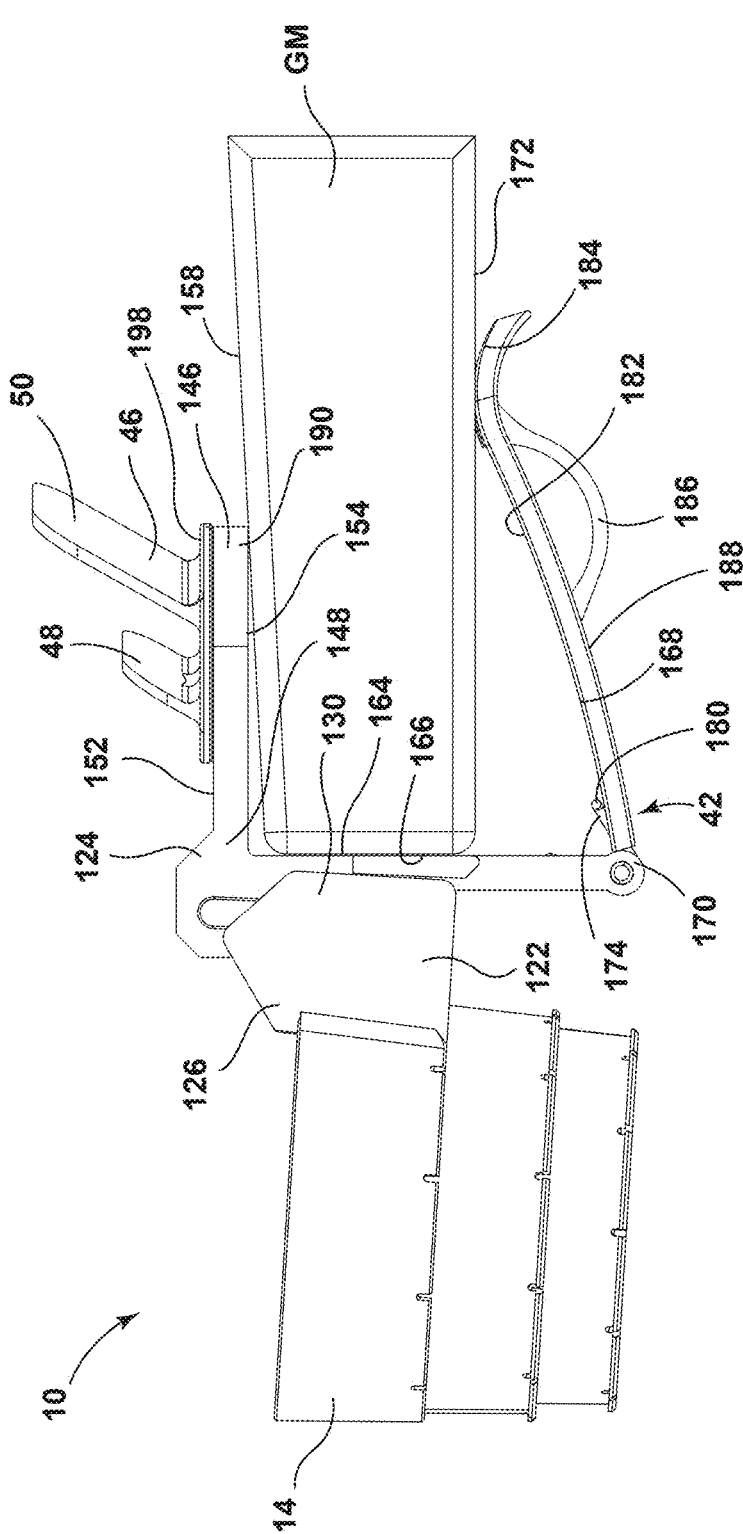
FIG. 28 is a side view of the beverage caddy assembly of FIG. 26 according to the fourth embodiment of the present disclosure, in the extended and installed position.

A fourth embodiment of the beverage caddy assembly 10 may be seen in FIGS. 26-28. Again, the same reference numbers for the same or similar structures as those used in the embodiments described above have been employed, unless noted differently. A description of substantially identical structures and features is omitted.

In the fourth embodiment of the beverage caddy assembly 10, the second mounting arm segment 124 may further include a spring-loaded clip 168 extending substantially orthogonally from a lower portion 170 of the second mounting arm segment 124. Spring-loaded clip 168 may be urged toward the mounting leg 146 and against an exposed lower horizontal surface 172 of the gaming machine. and the spring-loaded clip 168 may be urged against an exposed lower horizontal surface 172 of the gaming machine GM. The lower face 154 of the mounting leg 146 is urged against the exposed upper horizontal surface 158 of the gaming machine GM. The beverage caddy assembly 10 may thus be clamped to the gaming machine GM.

The spring-loaded clip 168 may include a torsion spring 174 having a first leg 176 operatively coupled with a proximal face 178 of the second mounting arm segment 124 and a second leg 180 operatively coupled with the spring-loaded clip 168 to urge the spring-loaded clip 168 towards the mounting leg 146. At least one of an upper face 182 of the spring-loaded clip 168 or the lower face 154 of the mounting leg 146 may be provided with a textured grip 184 disposed thereon and adapted for contact with the exposed upper or lower horizontal surfaces 158, 172 of the gaming machine GM, respectively. As shown in FIG. 26, the upper face 182 of the spring-loaded clip 168 may be provided with the textured grip 184, which may be fabricated as an elastomeric applique. In addition, a finger grip 186 adapted to assist in manipulation of the spring-loaded clip 168 may be provided on a lower face 188 of the spring-loaded clip 168.

In like manner as with the first embodiment, the fourth embodiment of the beverage caddy assembly 10 may be provided with a cell phone holder 46 disposed on a distal end 190 and on the upper face 152 of the mounting leg 146. Cell phone holder 46 may include a proximal vertical support tab 48 and a distal vertical support tab 50 defining therebetween a horizontal gap within which a cell phone may be disposed in a substantially upright position. As an additional benefit, the proximal vertical support tab 96 may also serve as a "hook" from which a strap of a bag or purse may be suspended. In addition, a rotatable table 198 may be provided upon which the cell phone holder 46 is disposed and about which the cell phone holder 46 may be rotated in a horizontal plane to provide an optimal viewing angle for a user, as perhaps best shown in FIG. 27.

In any of the second, third, and fourth embodiments, as with the first embodiment, the collapsible cup holder 14 may be constructed from the plurality of collapsible cup cylinders 52 with the support floor 64 or pedals 68 and in accordance with the specific configurations and features as described above.

Figure 29:
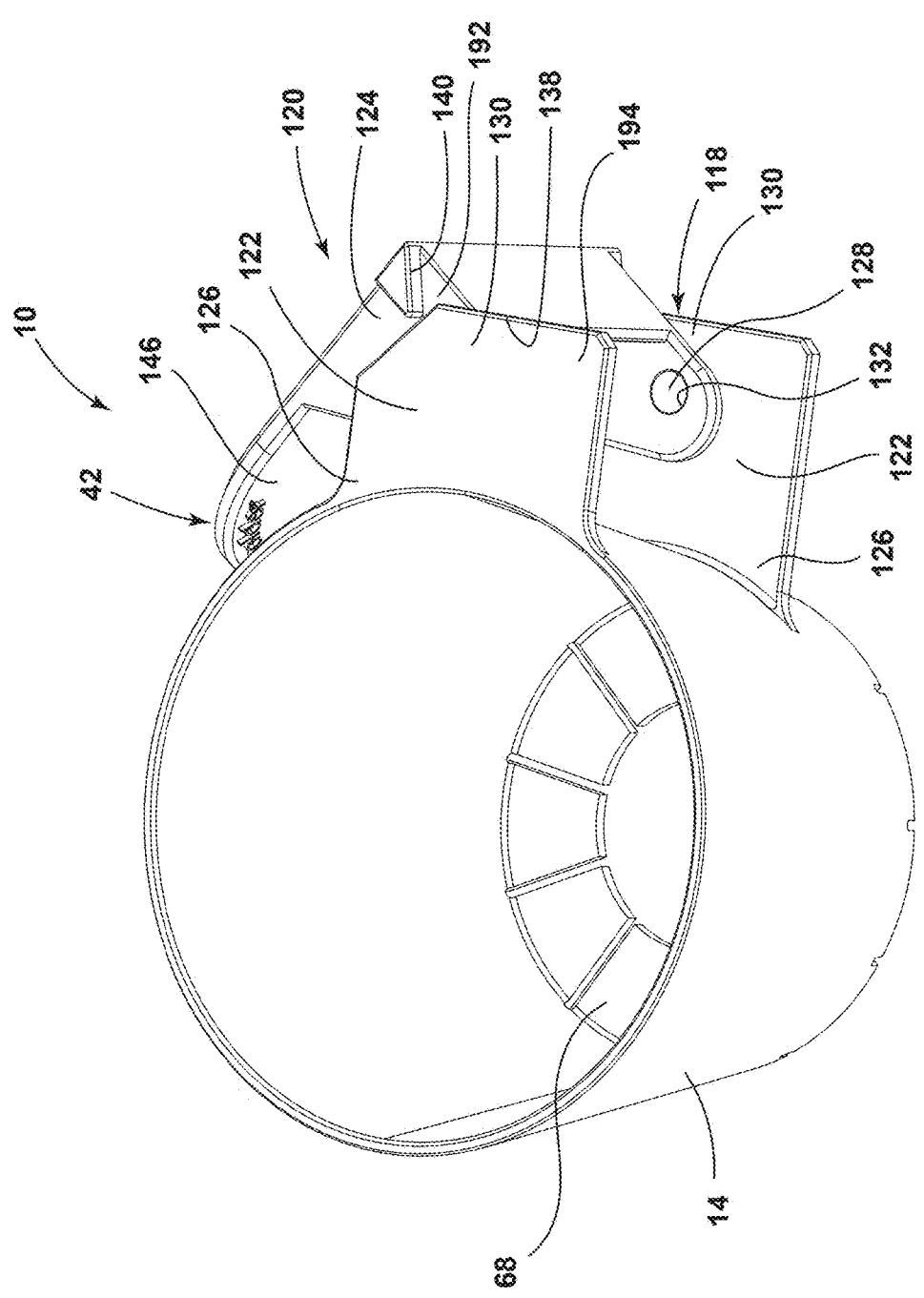
FIG. 29 is a perspective view of a fifth embodiment of the beverage caddy assembly according to the present disclosure, in the folded position.
Figure 30:
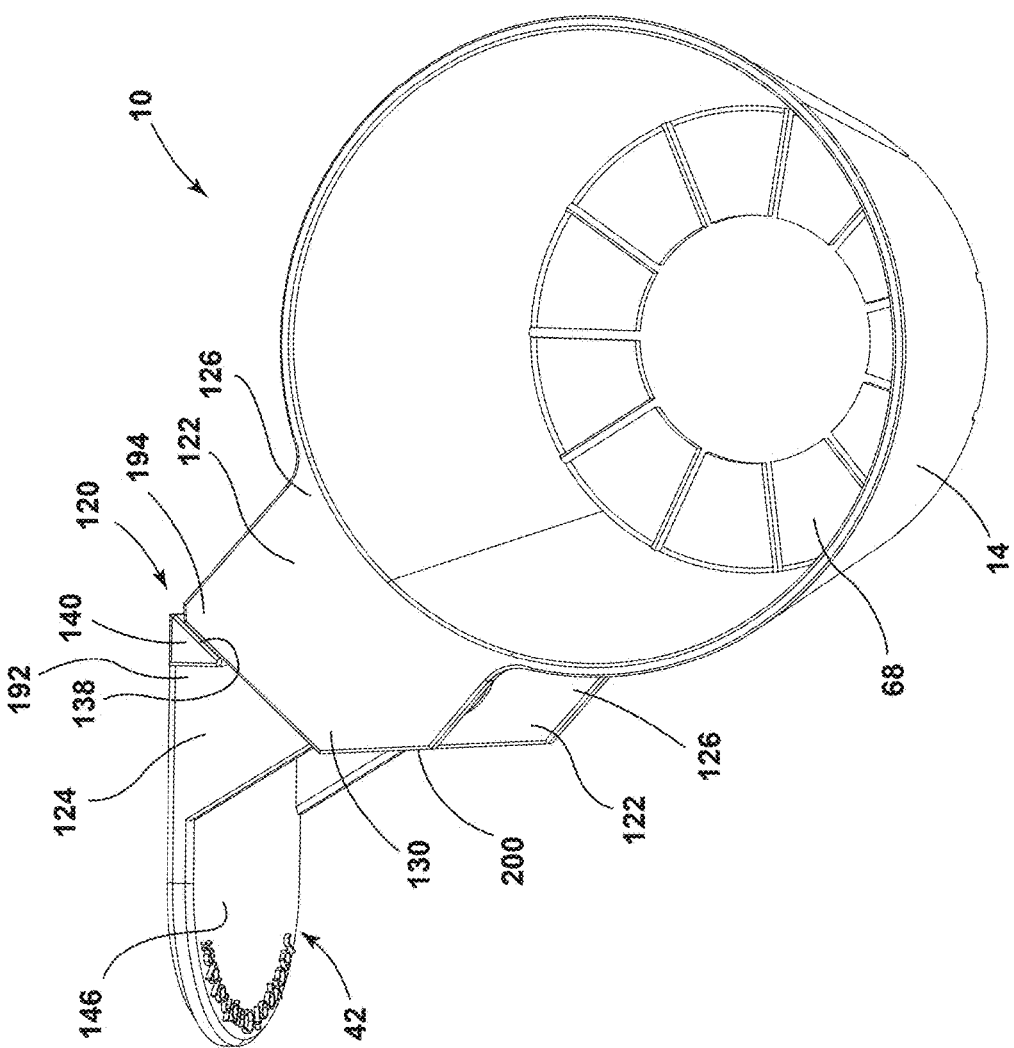
FIG. 30 is a top perspective view of the beverage caddy assembly of FIG. 29 according to the fifth embodiment of the present disclosure, in the extended position.
Figure 31:
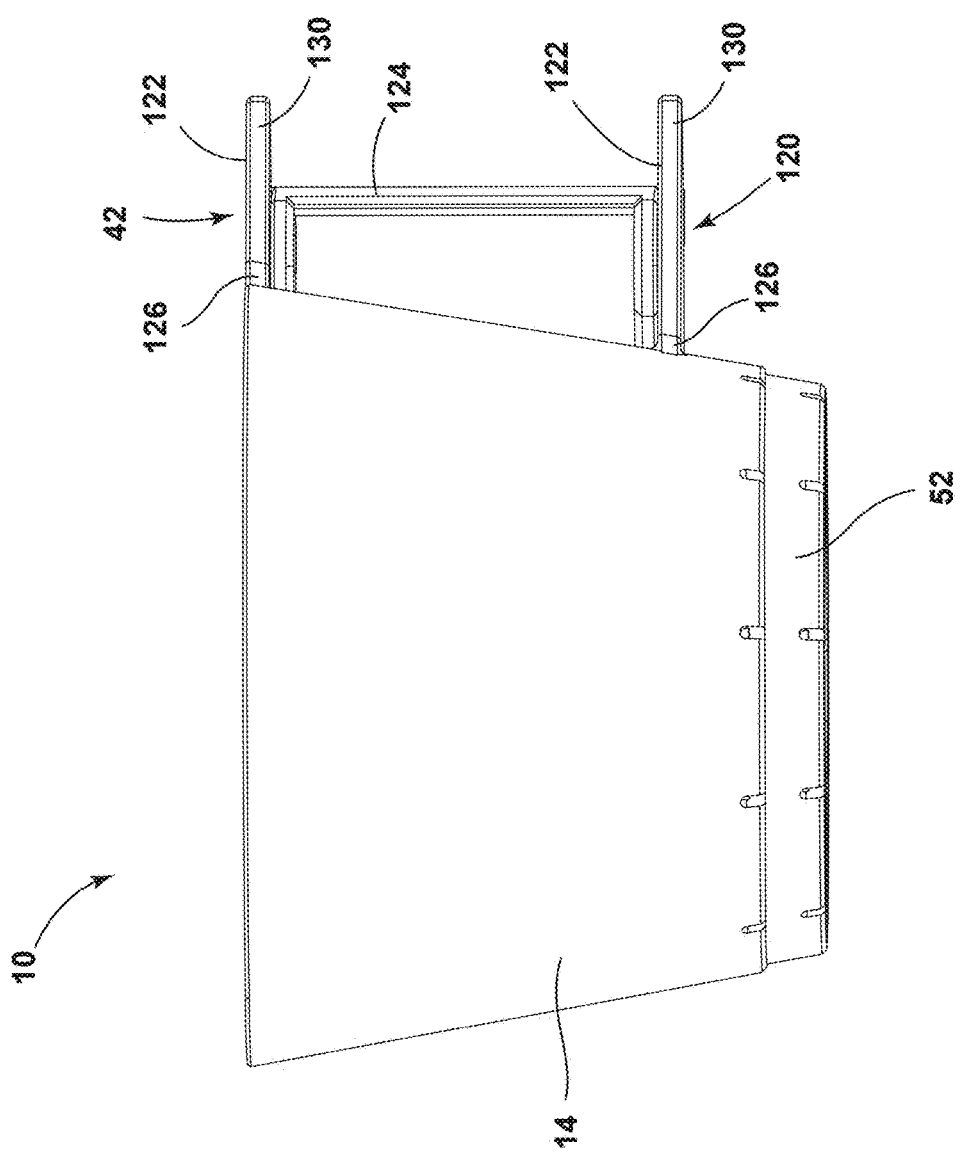
FIG. 31 is a side view of the beverage caddy assembly of FIG. 29 according to the fifth embodiment of the present disclosure, in the folded position.

A fifth embodiment of the beverage caddy assembly 10 may be seen in FIGS. 29-31. Again, the same reference numbers for the same or similar structures as those used in the embodiments described above have been employed, unless noted differently. A description of substantially identical structures and features is omitted.

In the fifth embodiment of the beverage caddy assembly 10, the cup holder 14, which may or may not be entirely or partially collapsable, may be coupled with a mounting arm 120. The mounting arm 120 may include a pair of first mounting arm segments 122 and a second mounting arm segment 124 moveable relative to the pair of first mounting arm segments 122. The proximal end 126 of each of the pair of first mounting arm segments 122 may be rigidly coupled with the cup holder 14, for example, by integrally molding the pair of first mounting arm segments 122 with the cup holder 14. Optionally, one or more collapsible cup cylinders 52 with the support floor 64 or pedals 68 and in accordance with the specific configurations and features as described above may be applied to the beverage caddy assembly 10 of the fifth embodiment, particularly at the bottom of the cup holder, as shown in FIG. 31.

A pair of inwardly facing and opposed hinge pins 128 may be disposed on a distal end 130 of each of the pair of first mounting arm segments 122, respectively, by which the pair of first mounting arm segments 122 and the cup holder 14 may be operably coupled with the second mounting arm segment 124. A pair of cooperating openings 132 may be disposed on the second mounting arm segment 124 and within which the pair of opposed hinge pins 128 are rotatably received. The cup holder 14 may thus be adapted for rotation between a first extended position and a second folded position disposing the cup holder 14 in juxtaposed relation with the second mounting arm segment 124.

The beverage caddy assembly 10 may also include an engagement member 42 disposed on the second mounting arm segment 124 and adapted for engaging the gaming machine GM. The pair of first mounting arm segments 122 may be arranged horizontally and extend horizontally from the cup holder 14, one above the other, and the engagement member 42 may be configured as a mounting leg 146 fixedly coupled with and extending orthogonally from a side and distal portion 192 of the second mounting arm segment 124.

The first mounting arm segment 122 may also include an abutting edge 138 on a distal portion 194 of an upper one of the pair of first mounting arm segments extending horizontally from the cup holder 14 adapted to engage an anchor tab 140 on the second mounting arm segment 124 to maintain the collapsible cup holder 14 in the first extended position when in use. When in the beverage caddy assembly 10 is in the first extended position, the first mounting arm segment 122 and the second mounting arm segment 124 may form a substantially straight edge 200 that may be brought into contact with the vertical surface 166 of the gaming machine GM as the mounting leg 146 is inserted into the vertical slot 196 of the gaming machine GM to essentially lock the beverage caddy assembly 10 in the first extended position and thereby further secure any beverage contained within.

The mounting leg 146 may be adapted for mounting the beverage caddy assembly 10 within a vertical slot 196 provided in the gaming machine GM, as shown in FIG. 20. In this configuration, with the beverage caddy assembly 10 in the first extended position, the mounting leg 146 of the beverage caddy assembly 10 may be simply and fully inserted into the vertical slot 196 in the gaming machine GM and the beverage caddy assembly 10 may then be released as ready to receive a beverage within the cup holder 14.

The beverage caddy assembly 10 of the foregoing embodiments is adapted to assume a collapsed configuration in which the cup holder 14 may be in the fully collapsed position and/or the hinge 18, 118 may be in the second folded position. In addition, the beverage caddy assembly 10 is adapted to assume a deployed configuration in which the cup holder 14 is in the fully extended position and the hinge 18, 118 is in the first extended position. The cup holder 14 is adapted for rotation between the first extended position and the second folded position about the hinge 18, 118, disposing the cup holder in juxtaposed relation with the second mounting arm segment 124 of a mounting arm 120 comprising the pair of first mounting arm segments 122 and a second mounting arm segment 124. Alternatively, the beverage caddy assembly 10 may be readily expanded to a deployed configuration in which the cup holder 14, if collapsible, is in a fully expanded position and rotated to the first extended position about hinge 18, 118. The engagement member 42 on a distal end 44 of the second mounting arm segment 124 may be brought into engagement with the gaming machine GM with any of the configurations disclosed above.

While the illustrated embodiments show the beverage caddy assembly 10, it will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. A beverage caddy assembly comprising:
a collapsible cup holder;
a mounting arm comprising a pair of first mounting arm segments and a second mounting arm segment moveable relative the pair of first mounting arm segments, wherein a proximal end of each of the pair of first mounting arm segments is rigidly coupled with the collapsible cup holder;
a pair of opposed hinge pins disposed on each of the pair of first mounting arm segments, respectively, by which the pair of first mounting arm segments and the collapsible cup holder are operably coupled with the second mounting arm segment;
a pair of elongated slots disposed on the second mounting arm segment and within which the pair of opposed hinge pins are rotatably and slidingly received, wherein the collapsible cup holder is adapted for rotation between a first extended position and a second folded position disposing the collapsible cup holder in juxtaposed relation with the second mounting arm segment; and
an engagement member disposed on the second mounting arm segment and adapted for engaging a gaming machine;
wherein the pair of opposed hinge pins is disposed proximate a first end of the pair of elongated slots when in the first extended position and the pair of opposed hinge pins is disposed proximate a second end of the pair of elongated slots when in the second folded position.

2. The beverage caddy assembly of claim 1, wherein each of the pair of first mounting arm segments further comprises an abutting edge adapted to engage an anchor tab disposed on opposed sides of the second mounting arm segment to maintain the collapsible cup holder in the first extended position when in use.

3. The beverage caddy assembly of claim 2, wherein the collapsible cup holder and the pair of first mounting arm segments are adapted for at least 180° rotation between the first extended position and the second folded position disposing the collapsible cup holder in juxtaposed relation with the second mounting arm segment when not in use.

4. The beverage caddy assembly of claim 1, further comprising a purse retainer on the second mounting arm segment.

5. The beverage caddy assembly of claim 4, wherein the purse retainer comprises a pair of raised shoulders on opposed sides of the second mounting arm segment.

6. The beverage caddy assembly of claim 1, wherein the engagement member comprises a mounting leg fixedly coupled with and extending orthogonally from an upper and distal portion of the second mounting arm segment and proximate the second end of the pair of elongated slots.

7. The beverage caddy assembly of claim 6 wherein the mounting leg is adapted for mounting the beverage caddy assembly within a horizontal slot provided in the gaming machine.

8. The beverage caddy assembly of claim 6, wherein the mounting leg further comprises an upper and lower face and at least one layer of double-sided tape disposed on the lower face of the mounting leg and adapted for affixing the beverage caddy assembly to an exposed horizontal surface of the gaming machine.

9. The beverage caddy assembly of claim 6, wherein the mounting leg further comprises an upper and lower face and at least one fastener opening through the upper and lower face of the mounting leg by which at least one fastener may be disposed for attachment of the lower face of the mounting leg of the beverage caddy assembly against an exposed upper horizontal surface of the gaming machine.

10. The beverage caddy assembly of claim 9, wherein the second mounting leg further comprises a fastener opening by which at least one fastener may be disposed for attachment of a distal face of the second mounting arm segment of the beverage caddy assembly against an exposed vertical surface of the gaming machine.

11. The beverage caddy assembly of claim 6, wherein the second mounting arm segment further comprises a spring-loaded clip extending orthogonally from a lower portion of the second mounting arm segment and the mounting leg further comprises an upper and lower face, and wherein the spring-loaded clip is urged against an exposed lower horizontal surface of the gaming machine and the lower face of the mounting leg is urged against an exposed upper horizontal surface of the gaming machine, whereby the beverage caddy assembly is clamped to the horizontal surface of the gaming machine.

12. The beverage caddy assembly of claim 11, wherein the spring-loaded clip comprises a torsion spring having a first leg operatively coupled with a front face of the second mounting arm segment and a second leg operatively coupled with the spring-loaded clip to urge the spring-loaded clip towards the mounting leg.

13. The beverage caddy assembly of claim 11, wherein at least one of an upper face of the spring-loaded clip or the lower face of the mounting leg comprise a textured grip disposed thereon and adapted for contact with exposed upper or lower horizontal surface of the gaming machine, respectively.

14. The beverage caddy assembly of claim 11, wherein a lower face of the spring-loaded clip comprises a finger grip adapted to assist in manipulation of the spring-loaded clip.

15. The beverage caddy assembly of claim 11, further comprising a cell phone holder disposed on a distal end and on the upper face of the mounting leg.

16. The beverage caddy assembly of claim 15, wherein the cell phone holder comprises a proximal vertical support tab and a distal vertical support tab defining therebetween a horizontal gap within which a cell phone may be disposed.

17. The beverage caddy assembly of claim 1, wherein the collapsible cup holder comprises a plurality of collapsible cup cylinders within which a cup may be supported.

18. The beverage caddy assembly of claim 17, wherein:

each of the plurality of collapsible cup cylinders comprises an inward and downward taper along their vertical height, such that a diameter of an upper peripheral edge of each one of the plurality of collapsible cup cylinders is larger than a diameter of a lower peripheral edge of the one of the plurality of collapsible cup cylinders;

the diameter of the upper peripheral edge of a one of the plurality of the collapsible cup cylinders upwardly adjacent another of a one of the plurality of the collapsible cup cylinders has a larger outer diameter than the diameter of the lower peripheral edge of a one of the plurality of collapsible cup cylinders downwardly adjacent the one of the plurality of collapsible cup cylinders; and each successive one of the plurality of collapsible cup cylinders is adapted to slide upward relative its upper neighbor, but only slide downward until the upper peripheral edge of a one of the plurality of collapsible cup cylinders engages and is further downwardly restrained by an inner surface of its upper neighbor.

19. The beverage caddy assembly of claim 17, wherein certain of the plurality of concentrically disposed collapsible cup cylinders that further comprise an outer lip extending outwardly about an upper peripheral edge and an inner lip extending inwardly about a lower peripheral edge, wherein the outer lip of the upper peripheral edge has a larger outer diameter than an inner diameter of the lower peripheral edge of the one of the plurality of concentrically disposed collapsible cup cylinders and the outer lip extending outwardly about the upper peripheral edge is adapted to engage the inner lip extending inwardly about the lower peripheral edge of an upper adjacent one of the plurality of concentrically disposed collapsible cup cylinders.

20. The beverage caddy assembly of claim 17, wherein a lowest one of the plurality of concentrically disposed collapsible cup cylinders further comprises a support floor.

21. The beverage caddy assembly of claim 20, wherein the floor comprises a substantially continuous ring about the lower peripheral edge of the lowest one of the plurality of concentrically disposed collapsible cup cylinders.

22. The beverage caddy assembly of claim 20, wherein the floor comprises a plurality of inwardly facing pedals about the lower peripheral edge of the lowest one of the plurality of concentrically disposed collapsible cup cylinders.

23. A beverage caddy assembly comprising:

a cup holder;

a mounting arm comprising a pair of first mounting arm segments and a second mounting arm segment moveable relative to the pair of first mounting arm segments, wherein a proximal end of each of the pair of first mounting arm segments is rigidly coupled with the cup holder;

a pair of opposed hinge pins disposed on each of the pair of first mounting arm segments, respectively, by which the pair of first mounting arm segments and the cup holder are operably coupled with the second mounting arm segment;

a pair of openings disposed on the second mounting arm segment and within which the pair of opposed hinge pins are rotatably received, wherein the cup holder is adapted for rotation between a first extended position and a second folded position disposing the cup holder in juxtaposed relation with the second mounting arm segment; and an engagement member disposed on the second mounting arm segment and adapted for engaging a gaming machine.

24. The beverage caddy assembly of claim 23, wherein the pair of first mounting arm segments are arranged horizontally and extend horizontally from the cup holder one above the other and the engagement member comprises a mounting leg fixedly coupled with and extending orthogonally from a side and distal portion of the second mounting arm segment.

25. The beverage caddy assembly of claim 24, wherein the first mounting arm segments comprise an abutting edge on a distal portion of an upper one of the pair of first mounting arm segments extending horizontally from the cup holder adapted to engage an anchor tab on the second mounting arm segment to maintain the collapsible cup holder in the first extended position when in use.

26. The beverage caddy assembly of claim 24 wherein the mounting leg is adapted for mounting the beverage caddy assembly within a vertical slot provided in the gaming machine.

27. A beverage caddy assembly comprising:

a collapsible cup holder;

a mounting arm comprising a pair of first mounting arm segments and a second mounting arm segment moveable relative to the pair of first mounting arm segments, wherein a proximal end of each of the pair of first mounting arm segments is rigidly coupled with the collapsible cup holder;

a hinge by which a distal end of each of the pair of first mounting arm segments is operably coupled with the proximal end of the second first mounting arm segment, wherein the cup holder is adapted for rotation between a first extended position and a second folded position about the hinge disposing the cup holder in juxtaposed relation with the second mounting arm segment; and an engagement member disposed on a distal end of the second mounting arm segment of the mounting arm and adapted to engage a gaming machine;

wherein the engagement member comprises a mounting leg fixedly coupled with and extending orthogonally from a distal portion of the second mounting arm segment.

28. The beverage caddy assembly of claim 27, wherein the beverage caddy assembly is adapted to assume a collapsed configuration in which the collapsible cup holder is in the fully collapsed position and the hinge is in the second folded position.

29. The beverage caddy assembly of claim 28, wherein the beverage caddy assembly is adapted to assume a deployed configuration in which the collapsible cup holder is in the first extended position and the hinge is in the first extended position.

\* \* \* \* \*